US012811658B2

(12) United States Patent
Bi et al.

(10) Patent No.: US 12,811,658 B2
(45) Date of Patent: Nov. 24, 2026

(54) MOBILITY MANAGEMENT IN SENSING-ASSISTED MIMO

(71) Applicant: HUAWEI TECHNOLOGIES CO., LTD., Shenzhen (CN)

(72) Inventors: Xiaoyan Bi, Shenzhen (CN); Jianglei Ma, Kanata (CA); Wen Tong, Kanata (CA); Peiying Zhu, Kanata (CA); Dageng Chen, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 576 days.

(21) Appl. No.: 18/331,467

(22) Filed: Jun. 8, 2023

(65) Prior Publication Data

US 2023/0318693 A1 Oct. 5, 2023

Related U.S. Application Data

(63) Continuation of application No. PCT/CN2020/139117, filed on Dec. 24, 2020.

(51) Int. Cl.
*H04B 7/06* (2006.01)
*H04B 7/08* (2006.01)
*H04W 16/28* (2009.01)

(52) U.S. Cl.
CPC ......... *H04B 7/06952* (2023.05); *H04B 7/088* (2013.01); *H04W 16/28* (2013.01)

(58) Field of Classification Search
CPC .... H04B 7/06952; H04B 7/088; H04W 16/28
See application file for complete search history.

(56) References Cited

U.S. PATENT DOCUMENTS

2006/0094449 A1 5/2006 Goldberg
2017/0041830 A1* 2/2017 Davis .................. H04B 7/1851
2017/0215120 A1* 7/2017 Ahluwalia ........... H04W 92/20
2018/0220468 A1* 8/2018 Lin .................... H04W 74/002
2020/0259545 A1* 8/2020 Bai ....................... H04B 7/063
(Continued)

OTHER PUBLICATIONS

3GPP TSG-RAN2 Meeting #102 R2-1807687, "Discussion on Stage-2 Open Issues and TP to 38.300 for Handover", OPPO, Busan, Korea, May 21-25, 2018, total 7 pages, XP051464168.
(Continued)

*Primary Examiner* — Brian J. Gillis
(74) *Attorney, Agent, or Firm* — Slater Matsil, LLP

(57) ABSTRACT

Some embodiments of the present disclosure provide a transmit receive point (TRP) with sensing abilities. Through sensing over time, the TRP can obtain details of past locations of a user equipment (UE) and a current location of the UE. Furthermore, the TRP can predict a future location for the UE. Accordingly, the TRP can proactively arrange for switching of beam directions used for both downlink channels and uplink channels. Aspects of the present application relate to a unified physical layer beam switch mechanism for intra-cell mobility and inter-cell mobility. Intra-cell beam switching, wherein a to-be-activated beam is from the same cell as the existing beam, may be triggered by physical layer signaling or media access control signaling. Inter-cell beam switching, wherein a to-be-activated beam is from a different cell than the existing beam, may be triggered by physical layer signaling or media access control signaling.

21 Claims, 15 Drawing Sheets

(56) References Cited

U.S. PATENT DOCUMENTS

| | | | | |
|---|---|---|---|---|
| 2020/0275402 | A1 | 8/2020 | Shi et al. | |
| 2023/0076306 | A1* | 3/2023 | Gunnarsson | H04B 7/024 |
| 2023/0388865 | A1* | 11/2023 | Murray | H04B 7/0617 |
| 2024/0012084 | A1* | 1/2024 | Lei | H04B 7/0695 |
| 2025/0220448 | A1* | 7/2025 | Da Silva | H04W 16/18 |

OTHER PUBLICATIONS

Bao, Jingchao et al., "Motion Aware Beam Tracking in Mobile Millimeter Wave Communications: A Data-Driven Approach", ICC 2019-2019 IEEE International Conference on Communications (ICC), IEEE, May 20, 2019 (May 20, 2019), total 6 pages, XP033582505.

* cited by examiner

MOBILITY MANAGEMENT IN SENSING-ASSISTED MIMO

CROSS REFERENCE

This application is a continuation of International Application No. PCT/CN2020/139117, filed on Dec. 24, 2020, the disclosure of which is hereby incorporated by reference in its entirety.

TECHNICAL FIELD

The present disclosure relates generally to sensing-assisted MIMO and, in particular embodiments, to mobility management in sensing-assisted MIMO.

BACKGROUND

During communication between a transmit receive point (TRP) and a user equipment (UE), movement of the UE may cause a deterioration in the quality of the communications between the TRP and the UE. Typically, the TRP may determine a new beam direction for the communications, indicate the new beam direction to the UE and arrange beam switching. In some cases, the TRP may arrange to handover the communication with the UE to another TRP. The radio resource control signaling used to successfully carry out a beam switching from one TRP to another TRP may be shown to be inefficient and cumbersome.

SUMMARY

Aspects of the present application relate to a unified physical layer beam switch mechanism allowing for both intra-cell mobility and inter-cell mobility. Intra-cell beam switching, wherein a to-be-activated beam is from the same cell as the existing beam, may be triggered by physical layer signaling or media access control signaling. Inter-cell beam switching, wherein a to-be-activated beam is from a different cell than the existing beam, may be triggered by physical layer signaling or media access control signaling.

Conveniently, triggering by way of physical layer signaling or media access control signaling may be shown to be faster and more flexible than traditional triggering by way of radio resource control configuration. Distinct from known mobility management, aspects of the present application allow for maintenance of single beam operation or multi-beam operation. Similarly, aspects support single node/panel mode or multi node/panel mode at the user equipment. Through the use of artificial intelligence or sensing technology, a direction for a to-be-activated beam may be identified without beam measurement. So this invention has advantages of low latency, low overhead and low power consumption compared with known beam switching methods. Helpfully, resource settings for radio resource control connection setup between the user equipment and a target transmit receive point may be added to a handover command transmitted from the source transmit receive point to the user equipment.

According to an aspect of the present disclosure, there is provided a method. The method includes receiving a beam switching instruction over physical layer signaling, the beam switching instruction indicating: a time offset indication allowing for a determination of a future moment at which to activate a new beam; and a direction for the new beam, the direction expressed using coordinate information, the coordinate information expressed relative to a predefined coordinate system. The method further includes, before the future moment, communicating using a second beam having a second beam direction and, after the future moment, communicating using a third beam direction, the third beam direction corresponding to the first beam direction.

According to another aspect of the present disclosure, there is provided a device. The device includes a memory storing instructions and a processor. The processor is configured, by executing the instructions, to receive a beam switching instruction over physical layer signaling, the beam switching instruction indicating: a time offset indication allowing for a determination of a future moment at which to activate a new beam; and a direction for the new beam, the direction expressed using coordinate information, the coordinate information expressed relative to a predefined coordinate system. The processor is further configured to, before the future moment, communicate using a second beam having a second beam direction and, after the future moment, communicate using a third beam direction, the third beam direction corresponding to the first beam direction.

According to a further aspect of the present disclosure, there is provided a method. The method includes receiving a beam switching instruction over data transport layer signaling, the beam switching instruction indicating: a time offset indication allowing for a determination of a future moment at which to activate a new beam; and a direction for the new beam, the direction expressed using coordinate information, the coordinate information expressed relative to a predefined coordinate system. The method further includes, before the future moment, communicating using a second beam having a second beam direction and, after the future moment, communicating using a third beam direction, the third beam direction corresponding to the first beam direction.

According to an even further aspect of the present disclosure, there is provided a device. The device includes a memory storing instructions and a processor. The processor is configured, by executing the instructions, to receive a beam switching instruction over data transport layer signaling, the beam switching instruction indicating: a time offset indication allowing for a determination of a future moment at which to activate a new beam; and a direction for the new beam, the direction expressed using coordinate information, the coordinate information expressed relative to a predefined coordinate system. The processor is further configured to, before the future moment, communicate using a second beam having a second beam direction and, after the future moment, communicate using a third beam direction, the third beam direction corresponding to the first beam direction.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
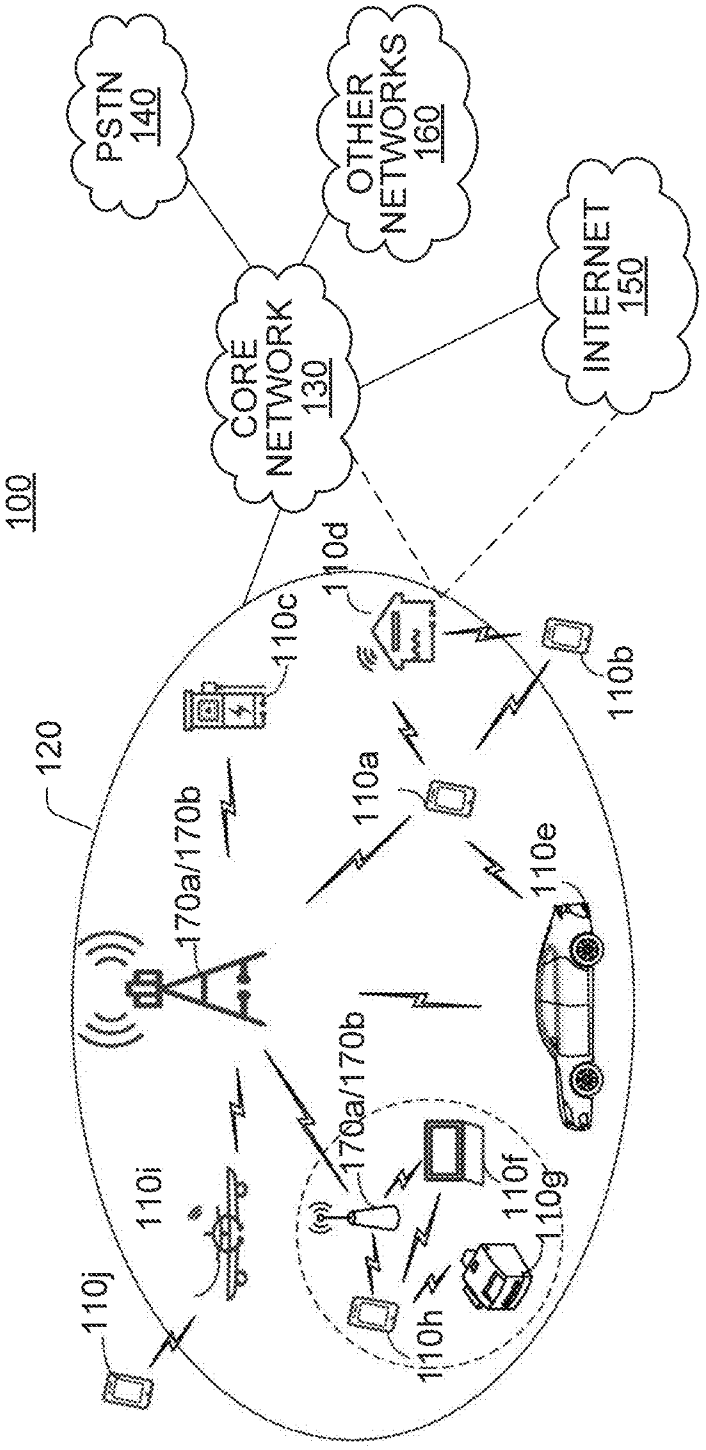
FIG. 1 illustrates, in a schematic diagram, a communication system in which embodiments of the disclosure may occur, the communication system includes multiple example electronic devices and multiple example transmit receive points along with various networks.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
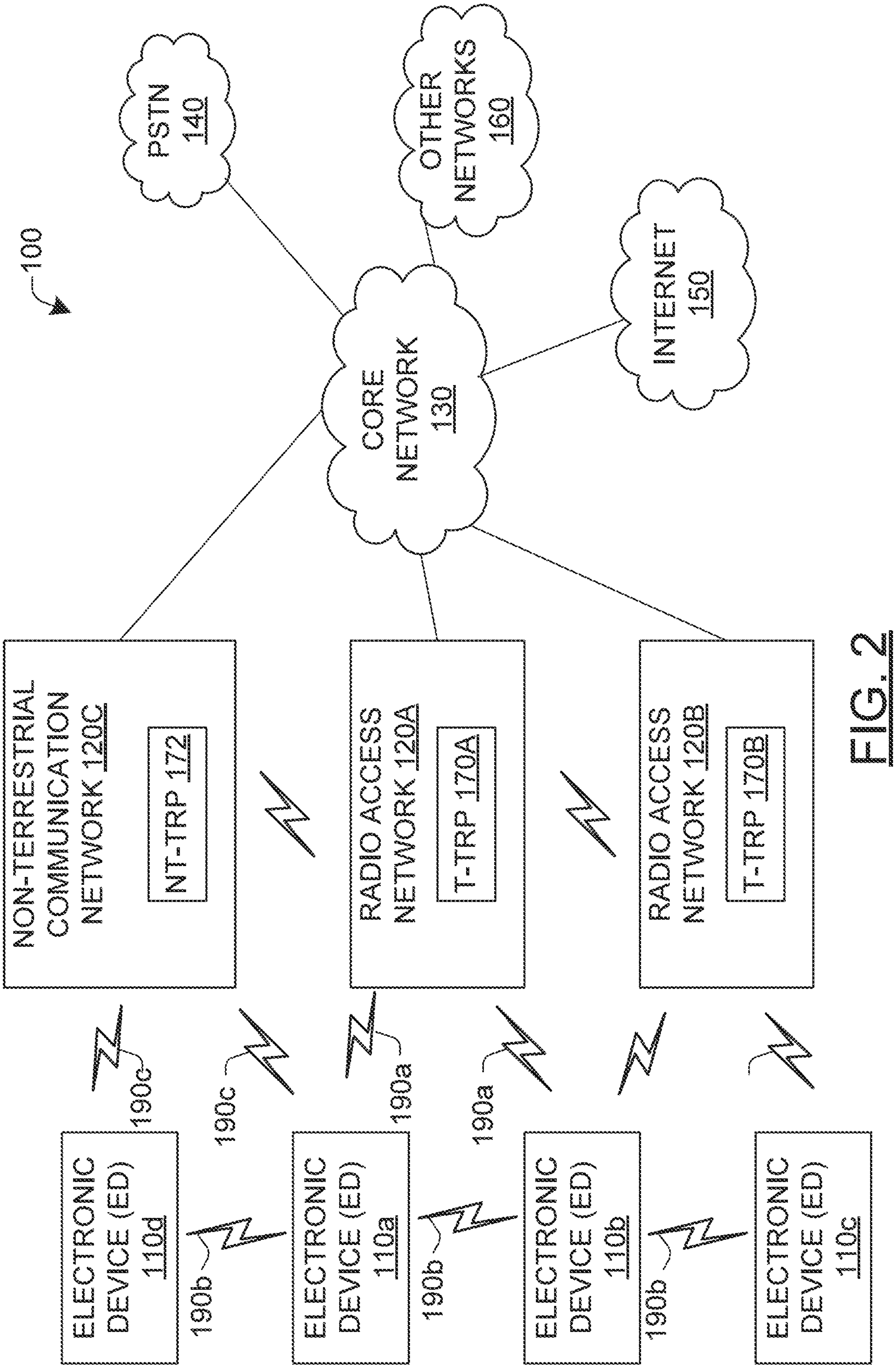
FIG. 2 illustrates, in a block diagram, the communication system of FIG. 1, the communication system includes multiple example electronic devices, an example terrestrial transmit receive point and an example non-terrestrial transmit receive point along with various networks.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BSs) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED 110 may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED 110*d* may communicate an uplink and/or downlink transmission over an non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The non-terrestrial air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120*a* and 120*b* are in communication with the core network 130 to provide the EDs 110*a*, 110*b*, 110*c* with various services such as voice, data and other services. The RANs 120*a* and 120*b* and/or the core network 130 may be in direct or indirect communication with one or more other RANs (not shown), which may or may not be directly served by core network 130 and may, or may not, employ the same radio access technology as RAN 120*a*, RAN 120*b* or both. The core network 130 may also serve as a gateway access between (i) the RANs 120*a* and 120*b* or the EDs 110*a* 110*b*, 110*c* or both, and (ii) other networks (such as the PSTN 140, the Internet 150, and the other networks 160). In addition, some or all of the EDs 110*a*, 110*b*, 110*c* may include functionality for communicating with different wireless networks over different wireless links using different wireless technologies and/or protocols. Instead of wireless communication (or in addition thereto), the EDs 110*a*, 110*b*, 110*c* may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110*a*, 110*b*, 110*c* may be multimode devices capable of operation according to multiple radio access technologies and may incorporate multiple transceivers necessary to support such.

Figure 3:
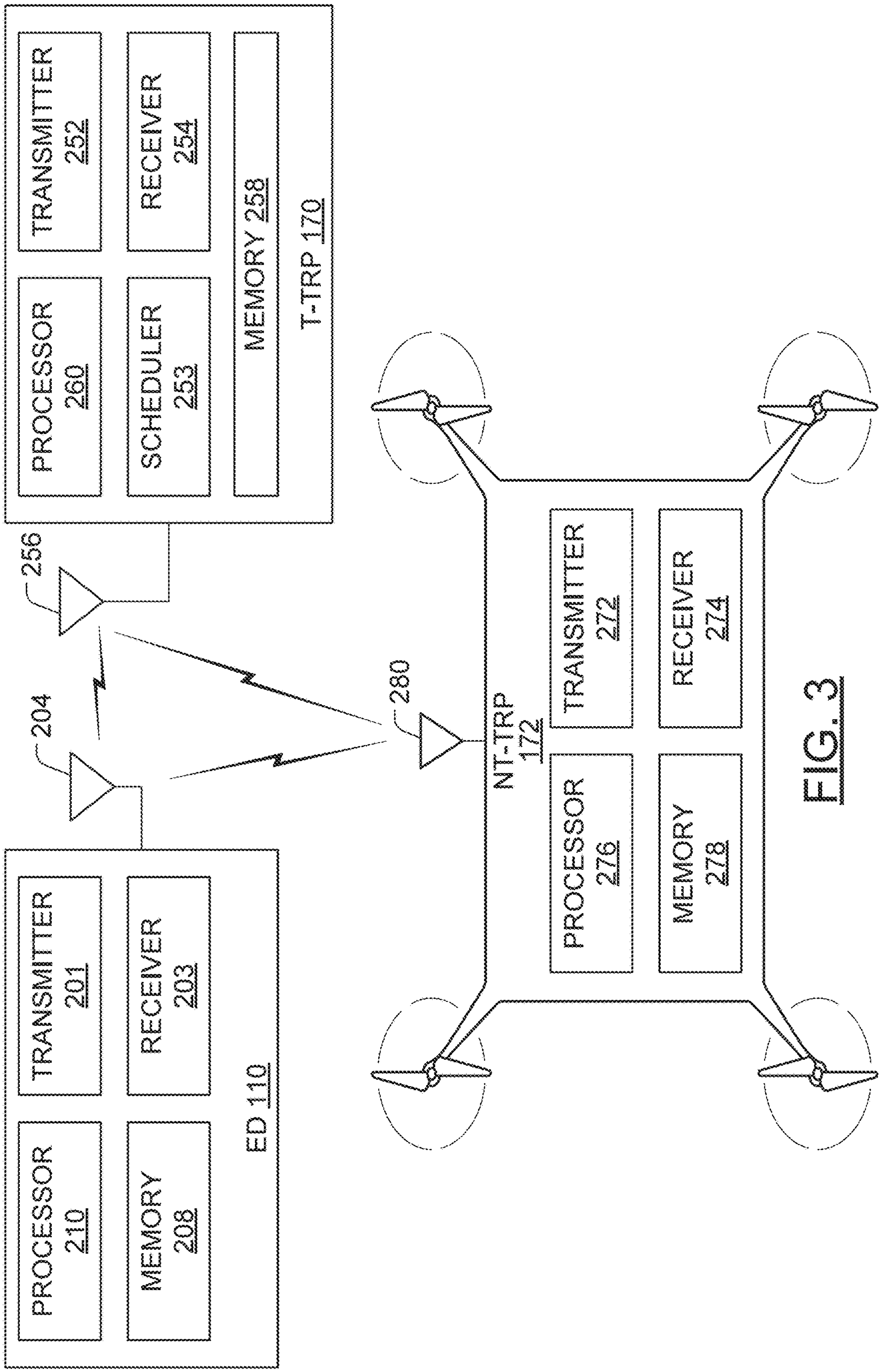
FIG. 3 illustrates, as a block diagram, elements of an example electronic device of FIG. 2, elements of an example terrestrial transmit receive point of FIG. 2 and elements of an example non-terrestrial transmit receive point of FIG. 2, in accordance with aspects of the present application.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170*a* and 170*b* each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED 110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

As illustrated in FIG. 3, the T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., multiple input multiple output, "MIMO," precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling," as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
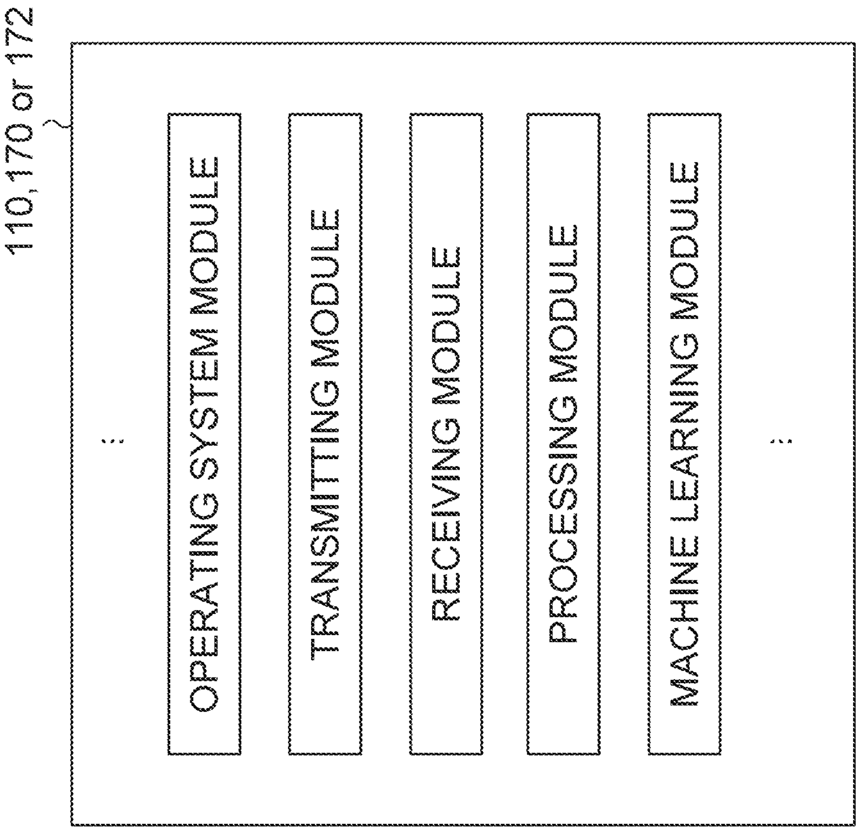
FIG. 4 illustrates, as a block diagram, various modules that may be included in an example electronic device, an example terrestrial transmit receive point and an example non-terrestrial transmit receive point, in accordance with aspects of the present application.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g., data) over a wireless communications link. The wireless communications link may support a link between a radio access network and user equipment (e.g., a "Uu" link), and/or the wireless communications link may support a link between device and device, such as between two user equipments (e.g., a "sidelink"), and/or the wireless communications link may support a link between a non-terrestrial (NT)-communication network and user equipment (UE). The following are some examples for the above components.

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform and low Peak to Average Power Ratio Waveform (low PAPR WF).

A frame structure component may specify a configuration of a frame or group of frames. The frame structure component may indicate one or more of a time, frequency, pilot signature, code or other parameter of the frame or group of frames. More details of frame structure will be discussed hereinafter.

A multiple access scheme component may specify multiple access technique options, including technologies defining how communicating devices share a common physical channel, such as: TDMA; FDMA; CDMA; SC-FDMA; Low Density Signature Multicarrier CDMA (LDS-MC-CDMA); Non-Orthogonal Multiple Access (NOMA); Pattern Division Multiple Access (PDMA); Lattice Partition Multiple Access (LPMA); Resource Spread Multiple Access (RSMA); and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources; and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all" concept. For example, it may be that the components within the air interface cannot be changed or adapted once the air interface is defined. In some implementations, only limited parameters or modes of an air interface, such as a cyclic prefix (CP) length or a MIMO mode, can be configured. In some embodiments, an air interface design may provide a unified or flexible framework to support frequencies below known 6 GHz bands and frequencies beyond the 6 GHz bands (e.g., mmWave bands) for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain and a frequency domain self-contained design may support more flexible RAN slicing through channel resource sharing between different services in both frequency and time.

A frame structure is a feature of the wireless communication physical layer that defines a time domain signal transmission structure to, e.g., allow for timing reference and timing alignment of basic time domain transmission units. Wireless communication between communicating devices may occur on time-frequency resources governed by a frame structure. The frame structure may, sometimes, instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g., uplink vs. downlink) occur in different frequency bands. TDD communication is when transmissions in different directions (e.g., uplink vs. downlink) occur over different time durations. FD communication is when transmission and reception occurs on the same time-frequency resource, i.e., a device can both transmit and receive on the same frequency resource contemporaneously.

One example of a frame structure is a frame structure, specified for use in the known long-term evolution (LTE) cellular systems, having the following specifications: each frame is 10 ms in duration; each frame has 10 subframes, which subframes are each 1 ms in duration; each subframe includes two slots, each of which slots is 0.5 ms in duration; each slot is for the transmission of seven OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD is specified as the integer time of OFDM symbol duration.

Another example of a frame structure is a frame structure, specified for use in the known new radio (NR) cellular systems, having the following specifications: multiple subcarrier spacings are supported, each subcarrier spacing corresponding to a respective numerology; the frame structure depends on the numerology but, in any case, the frame length is set at 10 ms and each frame consists of ten subframes, each subframe of 1 ms duration; a slot is defined as 14 OFDM symbols; and slot length depends upon the numerology. For example, the NR frame structure for normal CP 15 kHz subcarrier spacing ("numerology 1") and the NR frame structure for normal CP 30 kHz subcarrier spacing ("numerology 2") are different. For 15 kHz subcarrier spacing, the slot length is 1 ms and, for 30 kHz subcarrier spacing, the slot length is 0.5 ms. The NR frame structure may have more flexibility than the LTE frame structure.

Another example of a frame structure is, e.g., for use in a 6G network or a later network. In a flexible frame structure, a symbol block may be defined to have a duration that is the minimum duration of time that may be scheduled in the flexible frame structure. A symbol block may be a unit of transmission having an optional redundancy portion (e.g., CP portion) and an information (e.g., data) portion. An OFDM symbol is an example of a symbol block. A symbol block may alternatively be called a symbol. Embodiments of flexible frame structures include different parameters that may be configurable, e.g., frame length, subframe length, symbol block length, etc. A non-exhaustive list of possible configurable parameters, in some embodiments of a flexible frame structure, includes: frame length; subframe duration; slot configuration; subcarrier spacing (SCS); flexible transmission duration of basic transmission unit; and flexible switch gap.

The frame length need not be limited to 10 ms and the frame length may be configurable and change over time. In some embodiments, each frame includes one or multiple downlink synchronization channels and/or one or multiple downlink broadcast channels and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set to 5 ms for autonomous vehicle applications. As another example, smart meters on houses may not require fast initial access, in which case the frame length may be set as 20 ms for smart meter applications.

A subframe might or might not be defined in the flexible frame structure, depending upon the implementation. For example, a frame may be defined to include slots, but no subframes. In frames in which a subframe is defined, e.g., for time domain alignment, the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

A slot might or might not be defined in the flexible frame structure, depending upon the implementation. In frames in which a slot is defined, then the definition of a slot (e.g., in time duration and/or in number of symbol blocks) may be configurable. In one embodiment, the slot configuration is common to all UEs 110 or a group of UEs 110. For this case, the slot configuration information may be transmitted to the UEs 110 in a broadcast channel or common control channel(s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration may be transmitted independently from the frame configuration signaling and/or subframe configuration signaling. In general, the slot configuration may be system common, base station common, UE group common or UE specific.

The SCS may range from 15 KHz to 480 KHz. The SCS may vary with the frequency of the spectrum and/or maximum UE speed to minimize the impact of Doppler shift and phase noise. In some examples, there may be separate transmission and reception frames and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g., if more flexible symbol durations are implemented using inverse discrete Fourier transform (IDFT) instead of fast Fourier transform (FFT). Additional examples of frame structures can be used with different SCSs.

The basic transmission unit may be a symbol block (alternatively called a symbol), which, in general, includes a redundancy portion (referred to as the CP) and an information (e.g., data) portion. In some embodiments, the CP may be omitted from the symbol block. The CP length may be flexible and configurable. The CP length may be fixed within a frame or flexible within a frame and the CP length may possibly change from one frame to another, or from one group of frames to another group of frames, or from one subframe to another subframe, or from one slot to another slot, or dynamically from one scheduling to another scheduling. The information (e.g., data) portion may be flexible and configurable. Another possible parameter relating to a symbol block that may be defined is ratio of CP duration to information (e.g., data) duration. In some embodiments, the symbol block length may be adjusted according to: a channel condition (e.g., multi-path delay, Doppler); and/or a latency requirement; and/or an available time duration. As another example, a symbol block length may be adjusted to fit an available time duration in the frame.

A frame may include both a downlink portion, for downlink transmissions from a base station 170, and an uplink portion, for uplink transmissions from the UEs 110. A gap may be present between each uplink and downlink portion, which gap is referred to as a switching gap. The switching gap length (duration) may be configurable. A switching gap duration may be fixed within a frame or flexible within a frame and a switching gap duration may possibly change from one frame to another, or from one group of frames to another group of frames, or from one subframe to another subframe, or from one slot to another slot, or dynamically from one scheduling to another scheduling.

A device, such as a base station 170, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g., the center frequency, the lowest frequency or the highest frequency of the carrier. A carrier may be on a licensed spectrum or an unlicensed spectrum. Wireless communication with the device may also, or instead, occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and, optionally, one or multiple uplink resources. A cell may include one or multiple uplink resources and, optionally, one or multiple downlink resources. A cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may, instead or additionally, include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g., a carrier may have a bandwidth of 20 MHz and consist of one BWP or a carrier may have a bandwidth of 80 MHz and consist of two adjacent contiguous BWPs, etc. In other embodiments, a BWP may have one or more carriers, e.g., a BWP may have a bandwidth of 40 MHz and consist of two adjacent contiguous carriers, where each carrier has a bandwidth of 20 MHz. In some embodiments, a BWP may comprise non-contiguous spectrum resources, which consists of multiple non-contiguous multiple carriers, where the first carrier of the non-contiguous multiple carriers may be in the mmW band, the second carrier may be in a low band (such as the 2 GHz band), the third carrier (if it exists) may be in THz band and the fourth carrier (if it exists) may be in visible light band. Resources in one carrier which belong to the BWP may be contiguous or non-contiguous. In some embodiments, a BWP has non-contiguous spectrum resources on one carrier.

The carrier, the BWP or the occupied bandwidth may be signaled by a network device (e.g., by a base station 170) dynamically, e.g., in physical layer control signaling such as the known downlink control channel (DCI), or semi-statically, e.g., in radio resource control (RRC) signaling or in signaling in the medium access control (MAC) layer, or be predefined based on the application scenario; or be determined by the UE 110 as a function of other parameters that are known by the UE 110, or may be fixed, e.g., by a standard.

Going to the future wireless network, the number of the new devices could be increased exponentially with diverse functionalities. Also, a lot more new applications and use cases than those associated with 5G may emerge with more diverse quality of service demands. These use cases will result in new key performance indications (KPIs) for the future wireless networks (for an example, 6G network) that can be extremely challenging. It follows that sensing technologies and artificial intelligence (AI) technologies, especially machine learning and deep learning technologies, are being introduced to telecommunication for improving the system performance and efficiency.

AI technologies may be applied to communication systems. In particular AI technologies may be applied to communication in Physical layer and to communication in media access control (MAC) layer.

For the physical layer, the AI technologies may be employed to optimize component design and improve algorithm performance. For example, AI technologies may be applied to channel coding, channel modelling, channel estimation, channel decoding, modulation, demodulation, MIMO, waveform, multiple access, PHY element parameter optimization and update, beam forming and tracking and sensing and positioning, etc.

For the MAC layer, AI technologies may be utilized in the context of learning, predicting and making decisions to solve complicated optimization problems with better strategy and optimal solution. For one example, AI technologies may be utilized to optimize the functionality in MAC for, e.g., intelligent TRP management, intelligent beam management, intelligent channel resource allocation, intelligent power control, intelligent spectrum utilization, intelligent modulation and coding scheme selection, intelligent HARQ strategy, intelligent transmit/receive mode adaption, etc.

AI architectures usually involve multiple nodes. The multiple nodes can be organized in two modes, i.e., a centralized mode and a distributed mode, both of which modes can be deployed in an access network, a core network or an edge computing system or third network. A centralized training and computing architecture is restricted by communication overhead and strict user data privacy. Distributed training and computing architecture may be organized according to several frameworks, e.g., distributed machine learning and federated learning. AI architectures include an intelligent controller, which can perform as a single agent or as a multi-agent, based on joint optimization or individual optimization. New protocols and signaling mechanisms may be established so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, tracking, autonomous delivery and mobility. Terrestrial network-based sensing and non-terrestrial network-based sensing could provide intelligent context-aware networks to enhance the UE experience. For an example, terrestrial network-based sensing and non-terrestrial network-based sensing may be shown to provide opportunities for localization applications and sensing applications based on new sets of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial networks and in non-terrestrial networks, the measured channel data and sensing and positioning data can be obtained by large bandwidth, new spectrum, dense network and more light-of-sight (LOS) links. Based on these data, a radio environmental map can be drawn through AI methods, where channel information is linked, in the map, to its corresponding positioning, or environmental information, to, thereby, provide an enhanced physical layer design based on this map.

Sensing coordinators are nodes in a network that can assist in the sensing operation. These nodes can be standalone nodes dedicated to just sensing operations or other nodes (for example, the T-TRP 170, the ED 110, or a node in the core network 130) doing the sensing operations in parallel with communication transmissions. New protocol and signaling mechanism is needed so that the corresponding interface link can be performed with customized parameters to meet particular requirements while minimizing signaling overhead and maximizing the whole system spectrum efficiency.

AI and sensing methods are data-hungry. In order to involve AI and sensing in wireless communications, more and more data are needed to be collected, stored and exchanged. The characteristics of wireless data are known to expand to large ranges in multiple dimensions, e.g., from sub-6 GHz, millimeter to Terahertz carrier frequency, from space, outdoor to indoor scenario, and from text, voice to video. These data are collecting, processing and usage are performed in a unified framework or a different framework.

A terrestrial communication system may also be referred to as a land-based or ground-based communication system, although a terrestrial communication system can also, or instead, be implemented on or in water. The non-terrestrial communication system may bridge coverage gaps in underserved areas by extending the coverage of cellular networks through the use of non-terrestrial nodes, which will be key to establishing global, seamless coverage and providing mobile broadband services to unserved/underserved regions. In the current case, it is hardly possible to implement terrestrial access-points/base-stations infrastructure in areas like oceans, mountains, forests, or other remote areas.

The terrestrial communication system may be a wireless communications system using 5G technology and/or later generation wireless technology (e.g., 6G or later). In some examples, the terrestrial communication system may also accommodate some legacy wireless technologies (e.g., 3G or 4G wireless technology). The non-terrestrial communication system may be a communications system using satellite constellations, like conventional Geo-Stationary Orbit (GEO) satellites, which utilize broadcast public/popular contents to a local server. The non-terrestrial communication system may be a communications system using low earth orbit (LEO) satellites, which are known to establish a better balance between large coverage area and propagation path-loss/delay. The non-terrestrial communication system may be a communications system using stabilized satellites in very low earth orbits (VLEO) technologies, thereby substantially reducing the costs for launching satellites to lower orbits. The non-terrestrial communication system may be a communications system using high altitude platforms (HAPs), which are known to provide a low path-loss air interface for the users with limited power budget. The non-terrestrial communication system may be a communications system using Unmanned Aerial Vehicles (UAVs) (or unmanned aerial system, "UAS") achieving a dense deployment, since their coverage can be limited to a local area, such as airborne, balloon, quadcopter, drones, etc. In some examples, GEO satellites, LEO satellites, UAVs, HAPs and VLEOs may be horizontal and two-dimensional. In some examples, UAVs, HAPs and VLEOs may be coupled to integrate satellite communications to cellular networks. Emerging 3D vertical networks consist of many moving (other than geostationary satellites) and high altitude access points such as UAVs, HAPs and VLEOs.

MIMO technology allows an antenna array of multiple antennas to perform signal transmissions and receptions to meet high transmission rate requirements. The ED 110 and the T-TRP 170 and/or the NT-TRP may use MIMO to communicate using wireless resource blocks. MIMO utilizes multiple antennas at the transmitter to transmit wireless resource blocks over parallel wireless signals. It follows that multiple antennas may be utilized at the receiver. MIMO may beamform parallel wireless signals for reliable multipath transmission of a wireless resource block. MIMO may bond parallel wireless signals that transport different data to increase the data rate of the wireless resource block.

In recent years, a MIMO (large-scale MIMO) wireless communication system with the T-TRP 170 and/or the NT-TRP 172 configured with a large number of antennas has gained wide attention from academia and industry. In the large-scale MIMO system, the T-TRP 170, and/or the NT-TRP 172, is generally configured with more than ten antenna units (see antennas 256 and antennas 280 in FIG. 3). The T-TRP 170, and/or the NT-TRP 172, is generally operable to serve dozens (such as 40) of EDs 110. A large number of antenna units of the T-TRP 170 and the NT-TRP 172 can greatly increase the degree of spatial freedom of wireless communication, greatly improve the transmission rate, spectrum efficiency and power efficiency, and, to a large extent, reduce interference between cells. The increase of the number of antennas allows for each antenna unit to be made in a smaller size with a lower cost. Using the degree of spatial freedom provided by the large-scale antenna units, the T-TRP 170 and the NT-TRP 172 of each cell can communicate with many EDs 110 in the cell on the same time-frequency resource at the same time, thus greatly increasing the spectrum efficiency. A large number of antenna units of the T-TRP 170 and/or the NT-TRP 172 also enable each user to have better spatial directivity for uplink and downlink transmission, so that the transmitting power of the T-TRP 170 and/or the NT-TRP 172 and an ED 110 is reduced and the power efficiency is correspondingly increased. When the antenna number of the T-TRP 170 and/or the NT-TRP 172 is sufficiently large, random channels between each ED 110 and the T-TRP 170 and/or the NT-TRP 172 can approach orthogonality such that interference between cells and users and the effect of noise can be reduced. The plurality of advantages described hereinbefore enable large-scale MIMO to have a magnificent application prospect.

A MIMO system may include a receiver connected to a receive (Rx) antenna, a transmitter connected to transmit (Tx) antenna and a signal processor connected to the transmitter and the receiver. Each of the Rx antenna and the Tx antenna may include a plurality of antennas. For instance, the Rx antenna may have a uniform linear array (ULA) antenna, in which the plurality of antennas are arranged in line at even intervals. When a radio frequency (RF) signal is transmitted through the Tx antenna, the Rx antenna may receive a signal reflected and returned from a forward target.

A non-exhaustive list of possible unit or possible configurable parameters or in some embodiments of a MIMO system include: a panel; and a beam.

A panel is a unit of an antenna group, or antenna array, or antenna sub-array, which unit can control a Tx beam or a Rx beam independently.

A beam may be formed by performing amplitude and/or phase weighting on data transmitted or received by at least one antenna port. A beam may be formed by using another method, for example, adjusting a related parameter of an antenna unit. The beam may include a Tx beam and/or a Rx beam. The transmit beam indicates distribution of signal strength formed in different directions in space after a signal is transmitted through an antenna. The receive beam indicates distribution of signal strength that is of a wireless signal received from an antenna and that is in different directions in space. Beam information may include a beam identifier, or an antenna port(s) identifier, or a channel state information reference signal (CSI-RS) resource identifier, or a SSB resource identifier, or a sounding reference signal (SRS) resource identifier, or other reference signal resource identifier.

As one of key technologies of NR, MIMO can further improve a system capacity by using more spatial degrees of freedom.

Mobility management is one of the elements of successful use of MIMO. Mobility management includes intra-cell mobility management and inter-cell mobility management. Intra-cell mobility management refers to intra-cell beam switching management. Beam switching management relates to handing over a UE connection from one beam to another beam in the same cell. Beams before switching are deactivated beams and beams after switching are activated beams. Intra-cell mobility management refers to inter-cell beam switching management. Inter-cell beam switching may also be referred to as handover (HO). Handover relates to handing over a UE connection from one beam in one cell to another beam in another cell.

Known intra-cell beam switching procedures and inter-cell beam switching procedures may not be considered entirely distinct. The two procedures both require RRC configuration, but the triggering modes are different.

Traditional intra-cell beam switching is known to be triggered by signaling on the Physical Layer, which is also known as "PHY," "Layer 1" and "L1." Known intra-cell beam switching does not require explicit RRC signaling.

Traditional inter-cell beam switching is known to be triggered by signaling on the RRC Layer, which is also known as the "RRC Layer," "Layer 3" and "L3." Known inter-cell beam switching relies upon explicit RRC signaling.

In addition, intra-cell beam switching is based on the L1 measurement of individual beams.

In contrast, inter-cell beam switching is based on the L3 cell level measurements of individual beams.

The two known beam switching procedures are sufficiently distinct as to justify two separate sets of procedures. Configuring a communication system for both intra-cell beam switching and inter-cell beam switching, may be considered to make the communication system complex and redundant.

Beam indication is an important component of beam management. In current methods, a beam pair may be indicated using a quasi-colocation-based (QCL-based) beam indication method. QCL-based beam indication methods generally indicate a relationship between the target beam and a source reference beam. These two beams are considered to be QCL, which means that the features of the target beam can be deduced from the features of the source reference beam. After an RRC connection has been established, a Transmission Configuration Indicator (TCI) state may be used to associate a corresponding QCL type of one or two DL reference signals (e.g., SSB, CSI-RS, etc.). The known QCL-based beam indication method has several points of disadvantage. The first point is that the known QCL-based beam indication method can only indicate that the target RS and the source RS have a relationship with the same feature but cannot indicate other relationships. The second point is that the known QCL-based beam indication method requires source reference beams. Notably, the source reference beams need to be pre-trained and measured, resulting in a relatively large latency and relatively large overhead. With the increasing number of UEs 110 in future wireless communication networks, the overheads of beam training may be expected to increase sharply due to an increase in a quantity of training or measurement beams. The third point is that the known QCL-based beam indication method cannot directly indicate a physical direction relationship between beams.

In overview, given that the nature of an intra-cell beam switching scenario is similar to the nature of an inter-cell switching scenario, aspects of the present application relate to the development of a unified beam switching scheme that is compatible with both scenarios. In addition, the triggering manner based on L3 signal may be considered to be time-consuming and inflexible. It follows that the unified beam switching scheme includes aspects that allow for faster beam switching, including beam activation and beam deactivation.

In the unified beam switching scheme according to aspects of the present application, intra-cell beam switching and inter-cell beam switching both use a triggering mode based on PHY/MAC signaling. This triggering mode may be shown to be faster and more flexible than a triggering mode based on layer 3 signaling. It follows that aspects of the present application have advantages related low latency, low power consumption and low overhead. In addition, in the unified beam switching scheme according to aspects of the present application, indication of beam direction is coordinate-based. This manner of beam indication may be shown to be more direct and more agile than QCL-based beam indication and may also have lower power consumption and lower overheads when compared to QCL-based beam indication.

Figure 5:
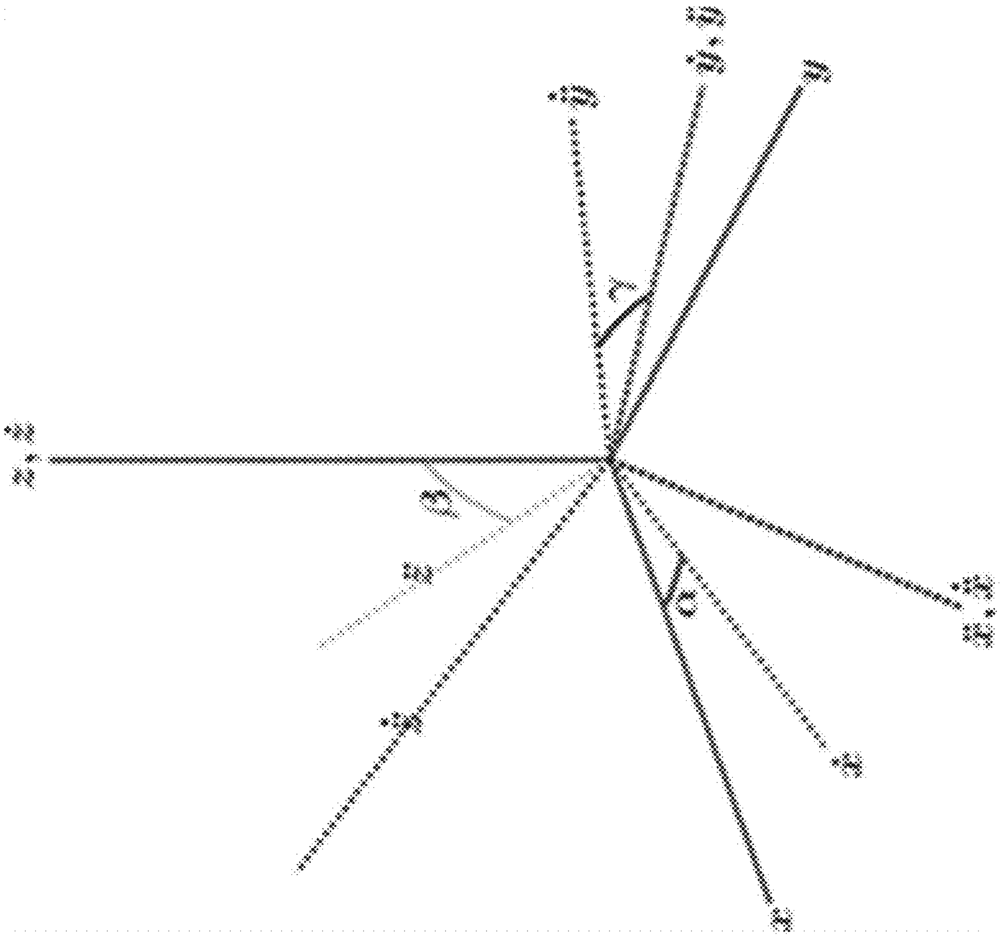
FIG. 5 illustrates a sequence of rotations that relate a global coordinate system to a local coordinate system.

Initially, a global coordinate system (GCS) and multiple local coordinate systems (LCS) may be defined. The GCS may be a global unified geographical coordinate system or a coordinate system comprising of only some TRPs 170 and UEs 110, defined by the RAN. From another perspective, GCS may be UE-specific or common to a group of UEs. An antenna array for a TRP 170 or a UE 110 can be defined in a Local Coordinate System (LCS). An LCS is used as a reference to define the vector far-field that is pattern and polarization, of each antenna element in an array. The placement of an antenna array within the GCS is defined by the translation between the GCS and an LCS. The orientation of the antenna array with respect to the GCS is defined in general by a sequence of rotations. The sequence of rotations may be represented by the set of angles α, β and γ. The set of angles {α, β, γ} can also be termed as the orientation of the antenna array with respect to the GCS. The angle α is called the bearing angle, β is called the downtilt angle and γ is called the slant angle. FIG. 5 illustrates the sequence of rotations that relate the GCS and the LCS. In FIG. 5, an arbitrary 3D-rotation of the LCS is contemplated with respect to the GCS given by the set of angles {α, β, γ}. The set of angles {α, β, γ} can also be termed as the orientation of the antenna array with respect to the GCS. Any arbitrary 3-D rotation can be specified by at most three elemental rotations and, following the framework of FIG. 5, a series of rotations about the z, $\dot{y}$ and $\ddot{x}$ axes are assumed here, in that order. The dotted and double-dotted marks indicate that the rotations are intrinsic, which means that they are the result of one (•) or two (••) intermediate rotations. In other words, the $\dot{y}$ axis is the original y axis after the first rotation about the z axis and the x axis is the original x axis after a first rotation about the z axis and a second rotation about the $\dot{y}$ axis. A first rotation of α about the z axis sets the antenna bearing angle (i.e., the sector pointing direction for a TRP antenna element). The second rotation of β about the $\dot{y}$ axis sets the antenna downtilt angle.

Finally, the third rotation of γ about the x axis sets the antenna slant angle. The orientation of the x, y and z axes after all three rotations can be denoted as $\dddot{x}$, $\dddot{y}$ and $\dddot{z}$. These triple-dotted axes represent the final orientation of the LCS and, for notational purposes, may be denoted as the x', y' and z' axes (local or "primed" coordinate system).

Figure 6:
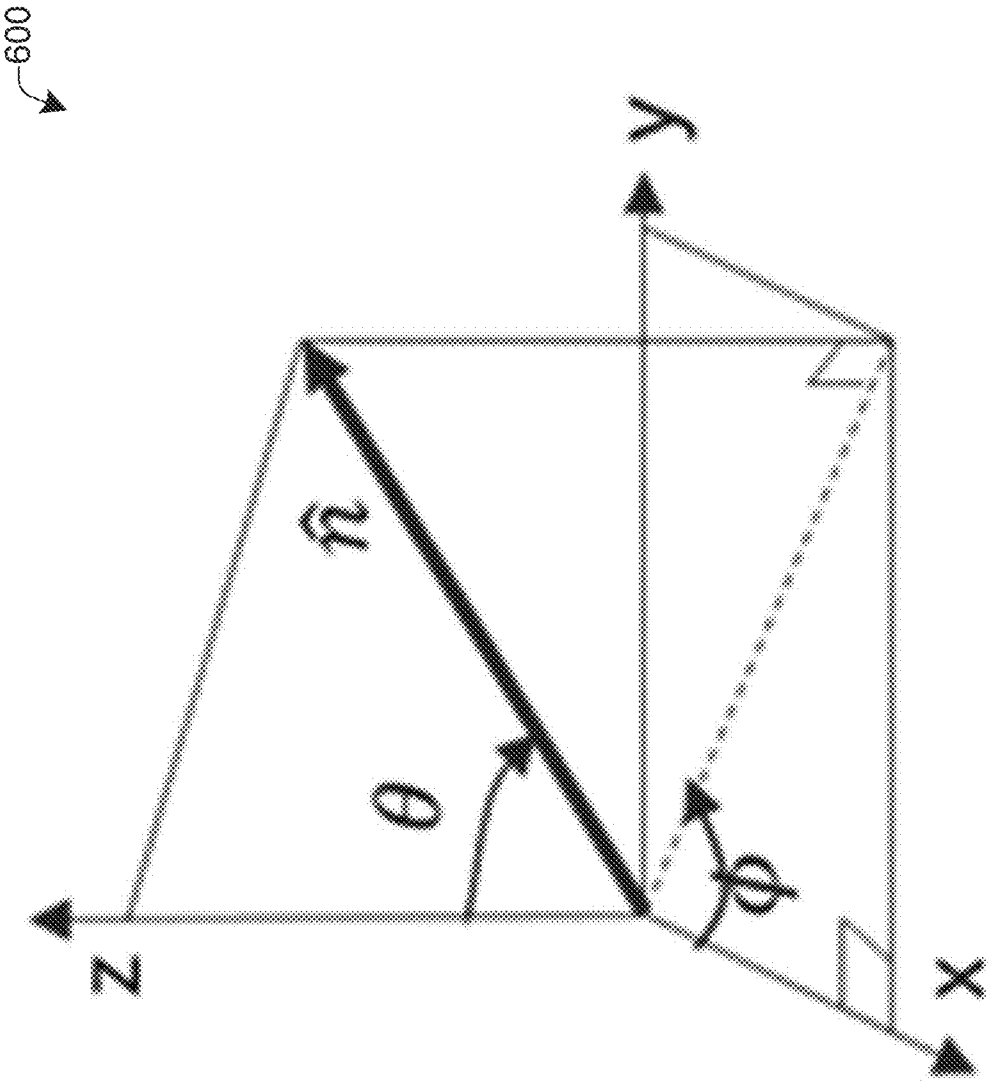
FIG. 6 illustrates spherical angles and spherical unit vectors.

A coordinate system is defined by the x, y and z axes, the spherical angles and the spherical unit vectors as illustrated in FIG. 6. A representation 600 in FIG. 6 defines a zenith angle θ and the azimuth angle ϕ in a Cartesian coordinate system. $\hat{n}$ is the given direction and the zenith angle, θ, and the azimuth angle, ϕ, may be used as the relative physical angle of the given direction. Note that θ=0 points to the zenith and ϕ=0 points to the horizon.

A method of converting the spherical angles (θ,ϕ) of the GCS into the spherical angles (θ', ϕ') of the LCS according to the rotation operation defined by the angles α, β and γ is given below.

To establish the equations for transformation of the coordinate system between the GCS and the LCS, a composite rotation matrix is determined that describes the transformation of point (x, y, z), in the GCS, into point (x', y', z'), in the LCS. This rotation matrix is computed as the product of three elemental rotation matrices. The matrix to describe rotations about the z, $\dot{y}$ and $\ddot{x}$ axes by the angles α, β and γ, respectively and in that order is defined in equation (1), as follows:

$$R = R_Z(\alpha)R_Y(\beta)R_X(\gamma) = \begin{pmatrix} +\cos\alpha & -\sin\alpha & 0 \\ +\sin\alpha & +\cos\alpha & 0 \\ 0 & 0 & 1 \end{pmatrix} \begin{pmatrix} +\cos\beta & 0 & +\sin\beta \\ 0 & 1 & 0 \\ \beta - \sin & 0 & \beta + \cos \end{pmatrix} \begin{pmatrix} 1 & 0 & 0 \\ 0 & +\cos\gamma & -\sin\gamma \\ 0 & +\sin\gamma & +\cos\gamma \end{pmatrix} \tag{1}$$

The reverse transformation is given by the inverse of R. The inverse of R is equal to the transpose of R, since R is orthogonal.

$$R^{-1}=R_X(-\gamma)R_Y(-\beta)R_Z(-\alpha)=R^T \tag{2}$$

The simplified forward and reverse composite rotation matrices are given in equations (3) and (4).

The relative physical angle, or beam direction "ξ," may be used as one or two of the coordinates for the beam indication. The TRP 170 may use conventional sensing signals to obtain the beam direction, to associate with the given UE 110.

If the coordinate system is defined by the x, y and z axes, the location "(x, y, z)," of the TRP 170 or the UE 110, may be used as one or two or three of the coordinates for beam indication. The location "(x, y, z)" may be obtained through the use of sensing signals.

The beam direction may contain a value representative of a zenith of an angle of arrival, a value representative of a $$R = \begin{pmatrix} \cos\alpha\cos\beta & \cos\alpha\ \sin\beta\sin\gamma - \sin\alpha\cos\gamma & \cos\alpha\ \sin\beta\cos\gamma + \sin\alpha\sin\gamma \\ \sin\alpha\cos\beta & \sin\alpha\sin\beta\sin\gamma + \cos\alpha\cos\gamma & \sin\alpha\ \sin\beta\cos\gamma - \cos\alpha\sin\gamma \\ -\sin\beta & \cos\beta\sin\gamma & \cos\beta\cos\gamma \end{pmatrix} \tag{3}$$

$$R^{-1} = \begin{pmatrix} \cos\alpha\cos\beta & \sin\alpha\cos\beta & -\sin\beta \\ \cos\alpha\sin\beta\ \sin\gamma - \sin\alpha\cos\gamma & \sin\alpha\sin\beta\sin\gamma + \cos\alpha\cos\gamma & \cos\beta\ \sin\gamma \\ \cos\alpha\sin\beta\cos\gamma + \sin\alpha\ \sin\gamma & \sin\alpha\sin\beta\cos\gamma - \cos\alpha\sin\gamma & \cos\beta\cos\gamma \end{pmatrix} \tag{4}$$

These transformations can be used to derive the angular and polarization relationships between the two coordinate systems.

In order to establish the angular relationships, consider a point (x, y, z) on the unit sphere defined by the spherical coordinates (ρ=1,θ,ϕ), where ρ is the unit radius, θ is the zenith angle measured from the +z-axis and ϕ is the azimuth angle measured from the +x-axis in the x-y plane. The Cartesian representation of that point is given by $$\hat{\rho} = \begin{pmatrix} x \\ y \\ z \end{pmatrix} = \begin{pmatrix} \sin\theta & \cos\varphi \\ \sin\theta & \sin\varphi \\ \cos\theta & \end{pmatrix} \tag{5}$$

The zenith angle is computed as $\arccos(\hat{\rho},\hat{z})$ and the azimuth angle as $\arg(\hat{x}\cdot\hat{\rho}+j\hat{y}\cdot\hat{\rho})$, where $\hat{x}$, $\hat{y}$ and $\hat{z}$ are the Cartesian unit vectors. If this point represents a location in the GCS defined by θ and ϕ, the corresponding position in the LCS is given by $R^{-1}\hat{\rho}$, from which local angles θ' and ϕ' can be computed. The results are given in equations (6) and (7)

zenith of an angle of departure, a value representative of an azimuth of an angle of arrival or an azimuth of an angle of departure.

A boresight orientation may be used as one or two of the coordinates for the beam indication. Additionally, a width may be used as one or two of the coordinates for the beam indication.

Location information and orientation information for the TRP 170 may be broadcast to all UEs 110 in communication range of the TRP 170. In particular, the location information for the TRP 170 may be included in the known System Information Block 1 (SIB1). Alternatively, the location information for the TRP 170 may be included as part of a configuration of the given UE 110.

According to the absolute beam indication aspects of the present application, when providing a beam indication to the given UE 110, the TRP may indicate the beam direction, ξ, as defined in the local coordinate system.

In contrast, according to the differential beam indication aspects of the present application, when providing a beam indication to the given UE 110, the TRP may indicate the beam direction using differential coordinates, Δξ, relative to $$\theta'(\alpha,\ \beta,\ \gamma;\theta,\ \varphi) = \cos^{-1}\left(\begin{bmatrix} 0 \\ 0 \\ 1 \end{bmatrix}^T R^{-1}\hat{\rho}\right) = \cos^{-1}(\cos\beta\cos\gamma\cos\alpha + (\sin\beta\cos\gamma\cos(\varphi-\alpha) - \sin\gamma\sin(\varphi-\alpha))\sin\theta) \tag{6}$$

$$\phi'(\alpha,\ \beta,\ \gamma;\theta,\ \varphi) = \arg\left(\begin{bmatrix} 0 \\ j \\ 1 \end{bmatrix}^T R^{-1}\hat{\rho}\right) = \arg\begin{pmatrix} (\cos\beta\sin\theta\cos(\varphi-\alpha) - \sin\beta\cos\theta) + \\ j(\cos\beta\sin\gamma\cos\theta + (\sin\beta\sin\gamma\cos(\varphi-\alpha) + \cos\gamma\sin(\varphi-\alpha))\sin\theta) \end{pmatrix} \tag{7}$$

A beam link between the TRP 170 and the given UE 110 may be defined using various parameters. In the context of the local coordinate system, having the TRP 170 at the origin, the parameters may be defined to include a relative physical angle and an orientation between the TRP 170 and the given UE 110.

a reference beam direction. Of course, this approach relies on both the TRP 170 and the given UE 110 having been configured with the reference beam direction.

Figure 7:
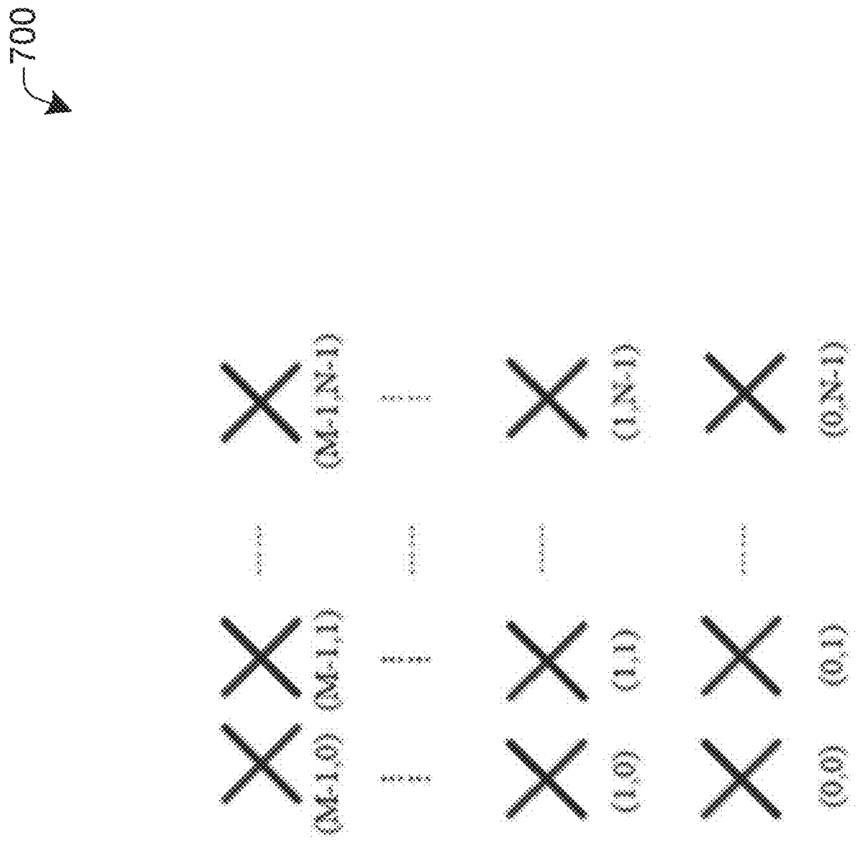
FIG. 7 illustrates a two-dimensional planar antenna array structure of dual-polarized antenna.
Figure 8:
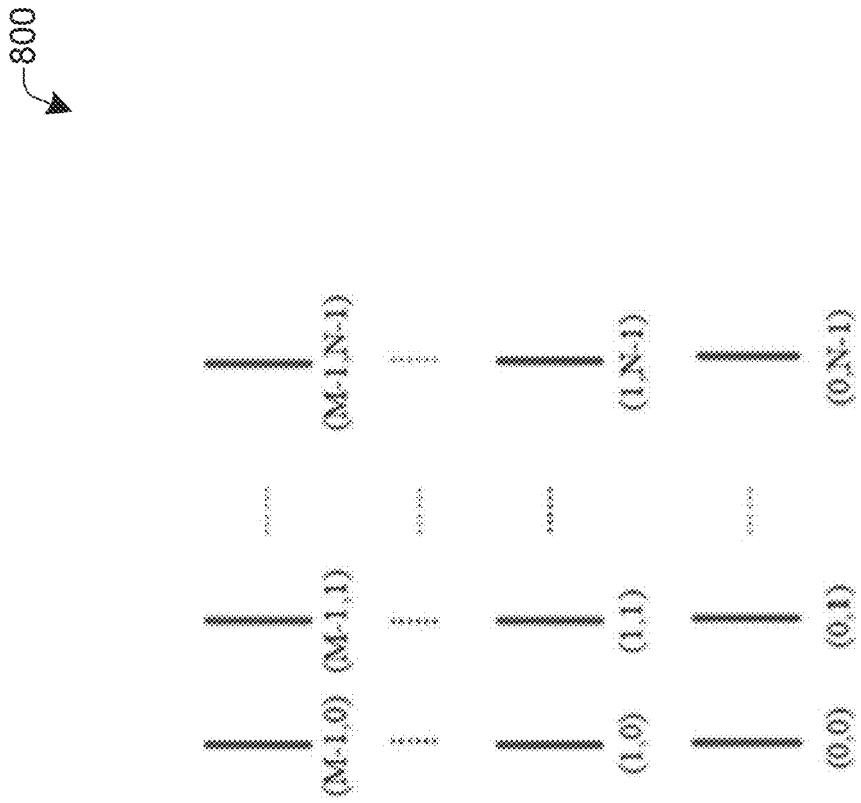
FIG. 8 illustrates a two-dimensional planar antenna array structure of single polarization antenna.

The beam direction could also be defined according to predefined spatial grids. FIG. 7 illustrates a two-dimensional planar antenna array structure 700 of a dual polarized antenna. FIG. 8 illustrates a two-dimensional planar antenna array structure 800 of a single polarized antenna. Antenna elements may be placed in vertical and horizontal directions as illustrated in FIGS. 7 and 8, where N is the number of columns and M is the number of antenna elements with the same polarization in each column. The radio channel between the TRP 170 and the UE 110 may be segmented into multiple zones. Alternatively, the physical space between the TRP 170 and the UE 110 may be segmented into 3D zones, wherein multiple spatial zones include the zones in vertical and horizontal directions.

Figure 9:
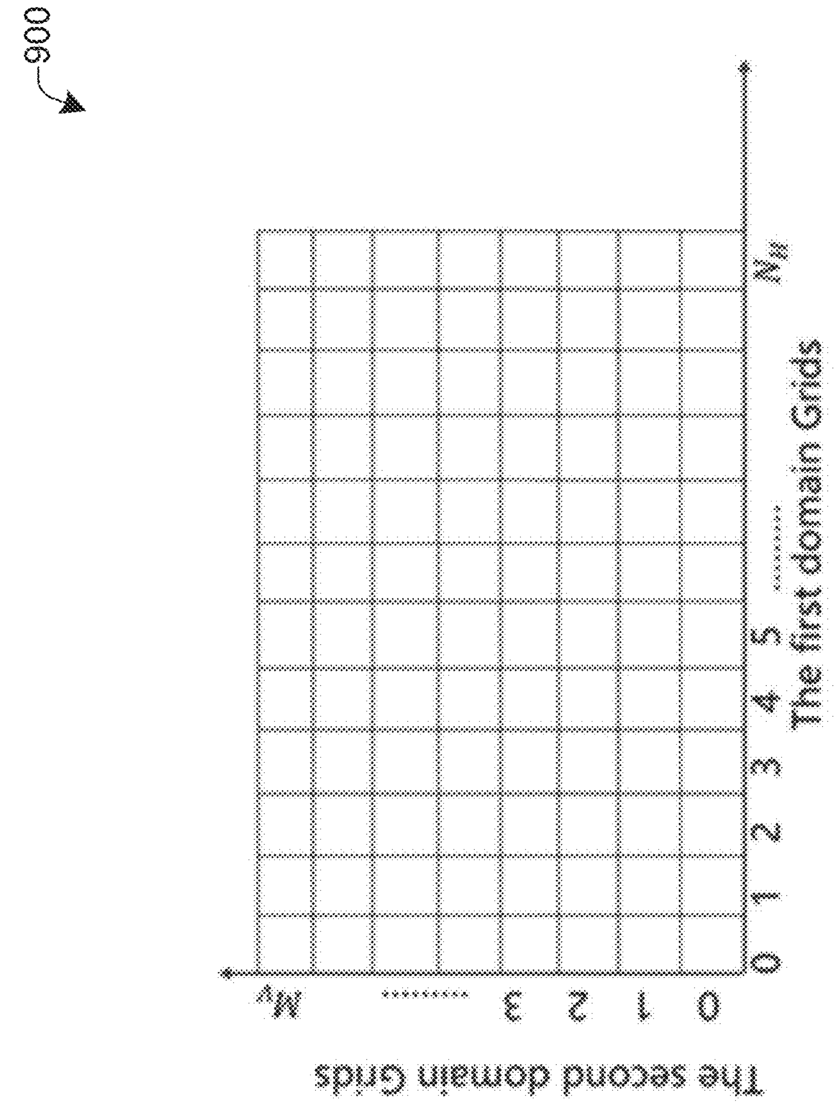
FIG. 9 illustrates a grid of spatial zones, allowing for spatial zones to be indexed.

With reference to a grid 900 of spatial zones illustrated in FIG. 9, a beam indication may be an index of a spatial zone, for example, the index of the grids. Here $N_H$ can be same or different as the N of the antenna array, $M_V$ could be same or different as the M of the antenna array. For an X-pol antenna array, the beam direction of the two-polarization antenna array can be indicated independently or by a single indication. Each of the grid is corresponding to a vector in column and a vector in row, which are generated by partial or full of the antenna array. Such beam indication in spatial domain may be indicated by the combination of a spatial domain beam and a frequency domain vector. Further, beam indication may be a one-dimensional index of the spatial zone (X-pol antenna array or Y-pol antenna array). In addition, a beam indication may be the three-dimension index of the spatial zone (X-pol antenna array and Y-pol antenna array and Z-pol antenna array).

Figure 10:
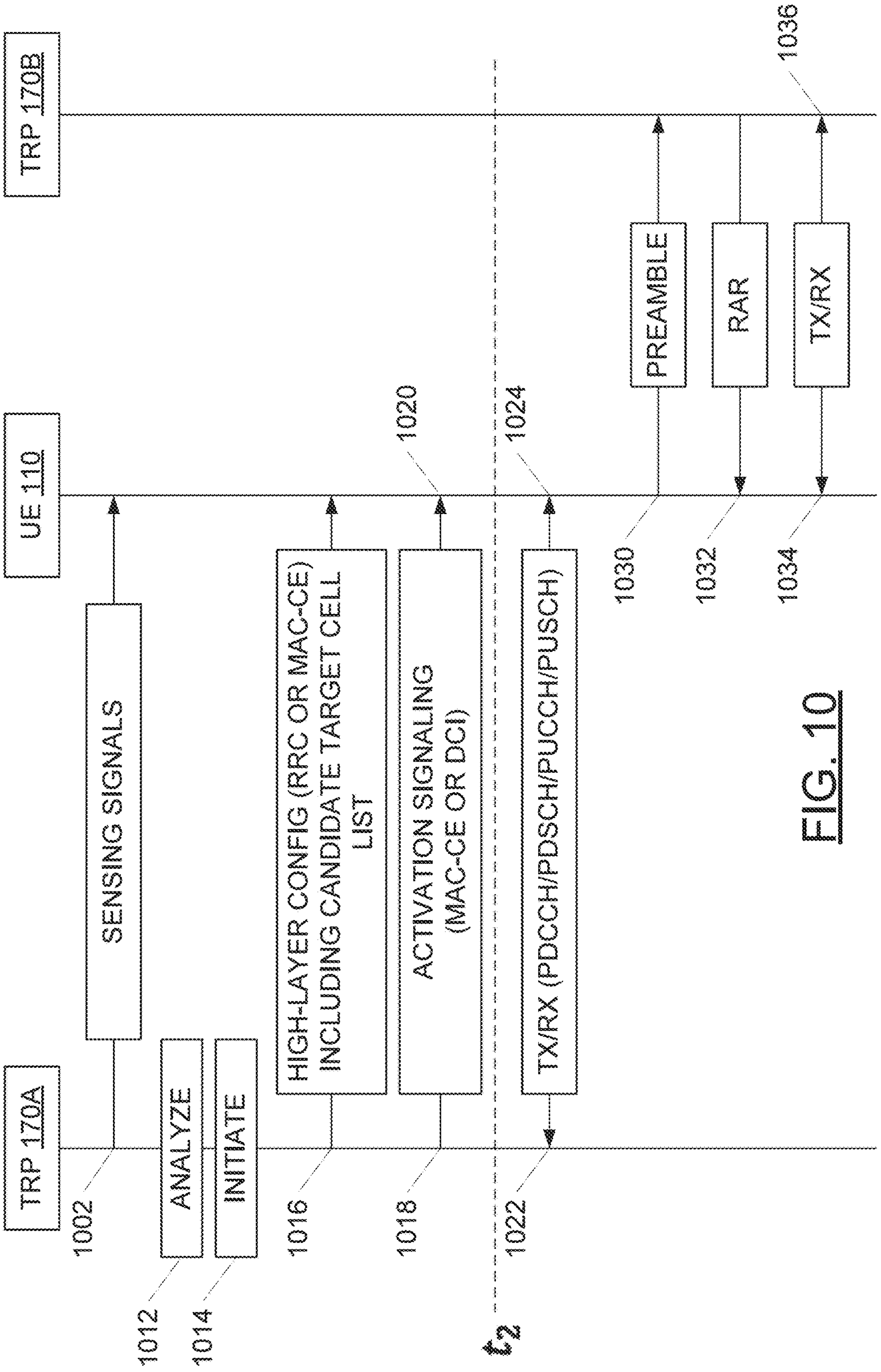
FIG. 10 illustrates, in a signal flow diagram, a beam switching process according to aspects of the present application.

FIG. 10 illustrates, in a signal flow diagram, a beam switching process according to aspects of the present application.

One aspect of predicting a reason for initiating a beam switching procedure involves the source TRP 170A monitoring the location of the UE 110.

Options for monitoring the location of the UE 110 may include the use of AI technology and the use of sensing signals and/or channel measurements and/or channel monitoring.

In one approach to the use of sensing signals, the source TRP 170A transmits (step 1002) sensing signals. The source TRP 170A then analyzes (step 1012) reflections of the sensing signals to obtain information about the environment in which both the source TRP 170A and the UE 110 are operating.

Step 1002 may be considered to be optional, since the beam direction could be obtained not only based on the sensing signal but also based on other approaches, for example, based on channel measurements for initial access and/or channel monitoring after initial access, or based on channel inferring by AI technologies from the historical channel data of the wireless network.

By analyzing (step 1012) versions of the sensed environment obtained through temporally separated transmissions (step 1002) of sensing signals, the source TRP 170A may monitor changes in the location of the UE 110. Notably, the source TRP 170A may not be able to directly monitor changes in the location of the UE 110. However, the source TRP 170A may be able to directly monitor changes in the location of a target (e.g., a car) and the source TRP 170A may maintain an association between the target and the UE 110.

In addition to the analyzing (step 1012) obtaining information about the present location of the UE 110 and past locations of the UE 110, the source TRP 170A may use the analyzing (step 1012) to attempt to predict a future location for the UE 110. It is in the attempt to predict a future location for the UE 110 that the source TRP 170A may employ AI technology. One result of the analyzing (step 1012) may be a future location for the UE 110. Another result of the analyzing (step 1012) may be a selection of a new transmit beam direction to activate for use, by the source TRP 170A, when transmitting to the UE 110 when the UE 110 is in the future location. On the basis of trends recognized in the analyzing (step 1012), the source TRP 170A may predict that the quality of the communication link between the source TRP 170A and the UE 110 will deteriorate at a future moment, $t_2$. That is, a further result of the analyzing (step 1012) may be a prediction of the future moment, $t_2$, at which the new transmit beam direction is expected to be activated to provide a more robust communication link than the existing transmit beam direction. Correspondingly, the former transmit beam is deactivated at the same future moment, $t_2$.

Responsive to initiating (step 1014) the beam switching procedure, the source TRP 170A transmits (step 1016) higher-layer configuration to UE 110 through RRC or MAC-CE. The configuration at least includes a candidate target cell ID list and corresponding candidate beam information. Beam ID and/or beam direction may be included in the candidate beam information.

Responsive to initiating (step 1014) the beam switching procedure, the source TRP 170A also transmits (step 1018), to the UE 110 using L1/L2 dynamic activation signaling, an activation instruction, that is, an instruction to perform beam switching. The transmission (step 1018) of the activation signaling may be accomplished using a MAC-CE on the PDSCH. Alternatively, the transmission (step 1018) of the activation signaling may be accomplished using a dedicated DCI on the PDCCH. The activation signaling may include a beam indication for a to-be-activated receive beam direction corresponding to the to-be-activated transmit beam direction and an indication of the future time at which the switch to the to-be-activated transmit beam direction will occur at the source TRP 170A.

The indication of the future time may take the form of a time offset (Δt), wherein Δt is equal to or larger than 0. The future moment, $t_2$, at which the new transmit beam direction is to be activated at the source TRP 170A may be determined, at the UE 110, by combining the time offset, Δt, which has been received (step 1020) as part of the activation signaling, with a reference time point, $t_{ref}$. The reference time point, $t_{ref}$, allows both the source TRP 170A and the UE 110 to determine the same moment, $t_2=t_{ref}+\Delta t$, for the switch to the to-be-activated transmit beam direction. The reference time point, $t_{ref}$, may be pre-configured at both the source TRP 170A and the UE 110. Alternatively, the reference time point, $t_{ref}$, may be transmitted (step 1018) as part of the activation signaling.

The activation signaling may indicate, to the UE 110, a beam direction to-be-activated for receiving a physical channel (PDCCH, PDSCH) and/or a beam direction to-be-activated for transmitting a physical channel (PUCCH, PUSCH). The activation signaling may indicate the to-be-activated beam direction using a coordinate-based beam indication. The activation signaling may indicate the to-be-activated beam direction as an absolute beam direction using the defined coordinate system. Alternatively, the activation signaling may indicate the to-be-activated receive beam direction using a differential representation of the to-be-activated receive beam direction in the context of a reference beam direction by using differential coordinates. The reference beam direction may be related to the beam direction used, by the source TRP 170A, to transmit (step 1002) the sensing signals.

Subsequent to transmitting (step 1018) the activation signaling, the source TRP 170A will find the to-be-switched target cell and beam in the activation signaling. The source TRP 170A wait until the specified future moment, $t_2$, to switch the new transmit beam direction for the task of transmitting (step 1022) to the UE 110 using the PDSCH and/or the PDCCH.

Responsive to receiving (step 1020) the activation signaling, the UE 110 will find the to-be-switched target cell and beam in the activation signaling. The UE 110 may wait until the specified future moment, $t_2$, to switch the new receive beam direction for the task of receiving (step 1024) transmissions from the source TRP 170A.

If a transmission (step 1022) is to be performed, by the source TRP 170A, after the future moment, $t_2$, the source TRP 170A is to activate the new transmit beam direction for communication (Tx/Rx, step 1022) after the future moment, $t_2$.

In the inter-cell scenario, at the future moment, $t_2$, the UE 110 transmits (step 1030) a physical random access channel (PRACH) preamble to the target TRP 170B using the new beam direction. The UE 110 then monitors the SSB beam until the UE 110 receives (step 1032) a random access response (RAR) from the target TRP 170B within a predetermined time window. Responsive to receiving (step 1032) the RAR, the UE 110 may perform a timing adjustment. After receiving (step 1032) the RAR, the physical layer at the UE 110 may report the actual beam direction to a higher layer at the UE 110.

Subsequently, the UE 110 may transmit and receive (step 1034) and the target TRP 170B may transmit and receive (step 1036) using the new beam direction.

Aspects of the present application provide a unified PHY beam switching mechanism with adaptations for intra-cell mobility and inter-cell mobility. The mechanism may maintain a single beam operation or a multi-beam operation. The mechanism may support a single node/panel mode or multiple nodes/panel modes at the UE 110. The activated beam direction may relate to the same cell (intra-cell) or may relate to different cells (inter-cell). In some aspects, indication of beam direction is performed using a coordinate-based beam indication method.

Figure 11:
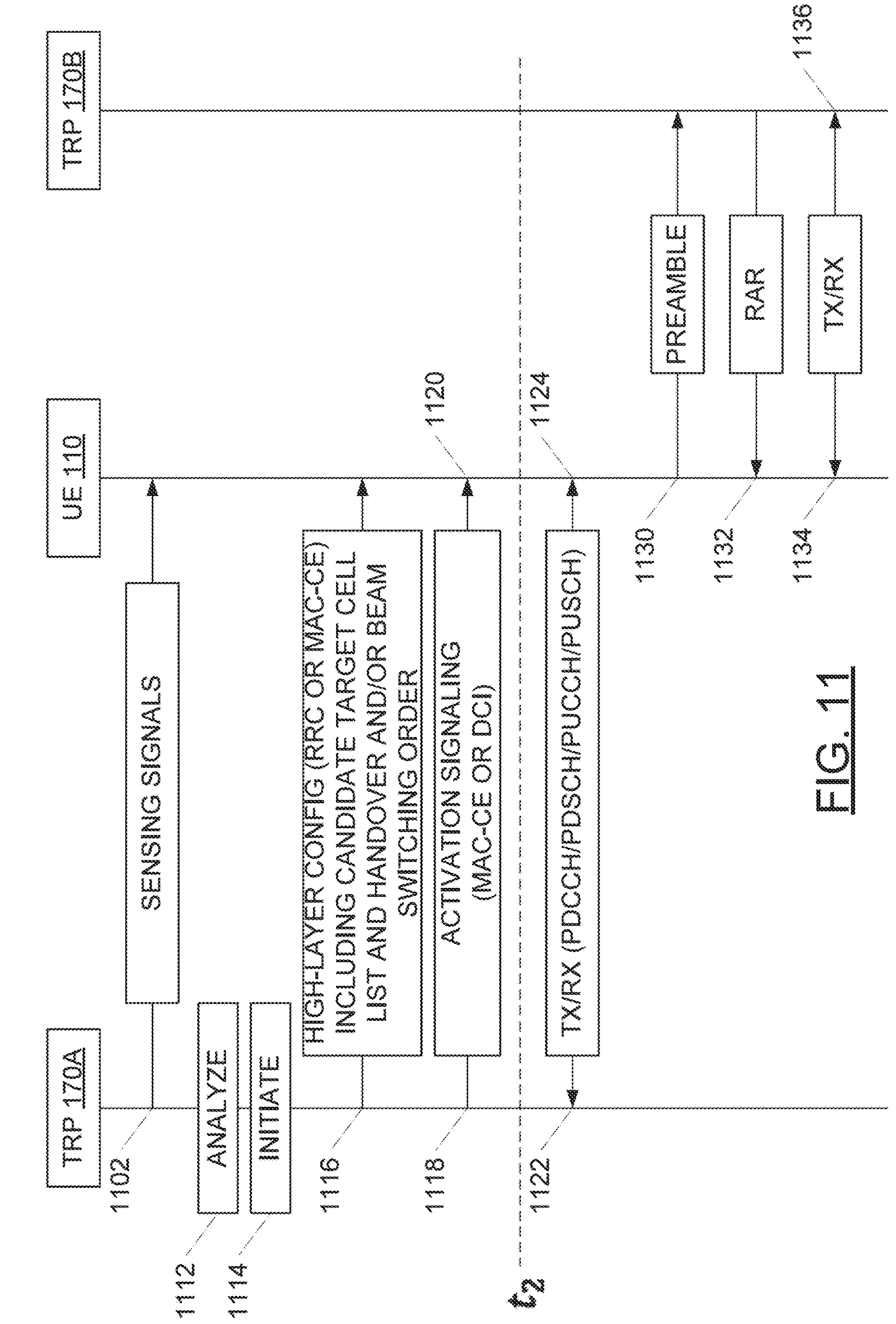
FIG. 11 illustrates, in a signal flow diagram, a beam switching process according to aspects of the present application.

FIG. 11 illustrates, in a signal flow diagram, a beam switching process according to aspects of the present application.

One aspect of predicting a reason for initiating a beam switching procedure involves the source TRP 170A monitoring the location of the UE 110.

Options for monitoring the location of the UE 110 may include the use of AI technology and the use of sensing signals and/or channel measurements and/or channel monitoring.

In one approach to the use of sensing signals, the source TRP 170A transmits (step 1102) sensing signals. The source TRP 170A then analyzes (step 1112) reflections of the sensing signals to obtain information about the environment in which both the source TRP 170A and the UE 110 are operating.

Step 1102 may be considered to be optional, since the beam direction could be obtained not only based on the sensing signal but also based on other approaches, for example, based on channel measurements for initial access and/or channel monitoring after initial access, or based on channel inferring by AI technologies from the historical channel data of the wireless network.

By analyzing (step 1112) versions of the sensed environment obtained through temporally separated transmissions (step 1102) of sensing signals, the source TRP 170A may monitor changes in the location of the UE 110. Notably, the source TRP 170A may not be able to directly monitor changes in the location of the UE 110. However, the source TRP 170A may be able to directly monitor changes in the location of a target (e.g., a car) and the source TRP 170A may maintain an association between the target and the UE 110.

In addition to the analyzing (step 1112) obtaining information about the present location of the UE 110 and past locations of the UE 110, the source TRP 170A may use the analyzing (step 1112) to attempt to predict a future location for the UE 110. It is in the attempt to predict a future location for the UE 110 that the source TRP 170A may employ AI technology. One result of the analyzing (step 1112) may be a future location for the UE 110. Another result of the analyzing (step 1112) may be a selection of a new transmit beam direction to activate for use, by the source TRP 170A, when transmitting to the UE 110 when the UE 110 is in the future location. On the basis of trends recognized in the analyzing (step 1112), the source TRP 170A may predict that the quality of the communication link between the source TRP 170A and the UE 110 will deteriorate at a future moment, $t_2$. That is, a further result of the analyzing (step 1112) may be a prediction of the future moment, $t_2$, at which the new transmit beam direction is expected to be activated to provide a more robust communication link than the existing transmit beam direction. Correspondingly, the former transmit beam is deactivated at the same future moment, $t_2$.

Responsive to initiating (step 1114) the beam switching procedure, the source TRP 170A transmits (step 1114) higher-layer configuration to UE 110 through RRC or MAC-CE. The configuration at least includes candidate target cell ID list and corresponding candidate beam information and the handover and/or beam switching order of each cell in the list. Beam ID and/or beam direction may be included in the candidate beam information.

The configuration, transmitted to the UE 110 in step 1116, may include a beam direction to-be-activated for receiving a physical channel (PDCCH, PDSCH) and/or a beam direction to-be-activated for transmitting a physical channel (PUCCH, PUSCH). The configuration may indicate the to-be-activated beam direction using a coordinate-based beam indication. The configuration may indicate the to-be-activated beam direction as an absolute beam direction using the defined coordinate system. Alternatively, the configuration may indicate the to-be-activated receive beam direction using a differential representation of the to-be-activated receive beam direction in the context of a reference beam direction by using differential coordinates. The reference beam direction may be related to the beam direction used, by the source TRP 170A, to transmit (step 1102) the sensing signals.

Responsive to initiating (step 1114) the beam switching procedure, the source TRP 170A transmits (step 1118), to the UE 110 using L1/L2 dynamic activation signaling, an activation instruction, that is, an instruction to perform beam switching. The transmission (step 1118) of the activation signaling may be accomplished using a MAC-CE on the PDSCH. Alternatively, the transmission (step 1118) of the activation signaling may be accomplished using a dedicated DCI on the PDCCH. The activation signaling may include an indication of the future time at which the switch to the to-be-activated transmit beam direction will occur at the source TRP 170A.

The indication of the future time may take the form of a time offset ($\Delta t$), wherein $\Delta t$ is equal to or larger than 0. The future moment, $t_2$, at which the new transmit beam direction is to be activated at the source TRP 170A may be determined, at the UE 110, by combining the time offset, $\Delta t$, which has been received (step 1120) as part of the activation signaling, with a reference time point, $t_{ref}$. The reference time point, $t_{ref}$, allows both the source TRP 170A and the UE 110 to determine the same moment, $t_2=t_{ref}+\Delta t$, for the switch to the to-be-activated transmit beam direction. The reference time point, $t_{ref}$, may be pre-configured at both the source TRP 170A and the UE 110. Alternatively, the reference time point, $t_{ref}$, may be transmitted (step 1118) as part of the activation signaling.

Subsequent to transmitting (step 1118) the activation signaling, the source TRP 170A will find the to-be-switched target cell and beam in order in the higher-layer configured list of candidate cell and beam. The source TRP 170A wait until the specified future moment, $t_2$, to switch the new transmit beam direction for the task of transmitting (step 1122) to the UE 110 using the PDSCH and/or the PDCCH.

Responsive to receiving (step 1120) the activation signaling, the UE 110 will find the to-be-switched target cell and beam in order in the higher-layer configured list of candidate cell and beam. The UE 110 may wait until the specified future moment, $t_2$, to switch the new receive beam direction for the task of receiving (step 1124) transmissions from the source TRP 170A.

If a transmission (step 1122) is to be performed, by the source TRP 170A, after the future moment, $t_2$, the source TRP 170A is to activate the new transmit beam direction for communication (Tx/Rx, step 1122) after the future moment, $t_2$.

In the inter-cell scenario, at the future moment, $t_2$, the UE 110 transmits (step 1130) a PRACH preamble to the target TRP 170B using the new beam direction. The UE 110 then monitors the SSB beam until the UE 110 receives (step 1132) a RAR from the target TRP 170B within a predetermined time window. Responsive to receiving (step 1132) the RAR, the UE 110 may perform a timing adjustment. After receiving (step 1132) the RAR, the physical layer at the UE 110 may report the actual beam direction to a higher layer at the UE 110.

Subsequently, the UE 110 may transmit and receive (step 1134) and the target TRP 170B may transmit and receive (step 1136) using the new beam direction.

Aspects of the present application provide a unified PHY beam switching mechanism with adaptations for intra-cell mobility and inter-cell mobility. The mechanism may maintain a single beam operation or a multi-beam operation. The mechanism may support a single node/panel mode or multiple nodes/panel modes at the UE 110. The activated beam direction may relate to the same cell (intra-cell) or may relate to different cells (inter-cell). In some aspects, indication of beam direction is performed using a coordinate-based beam indication method.

Figure 12:
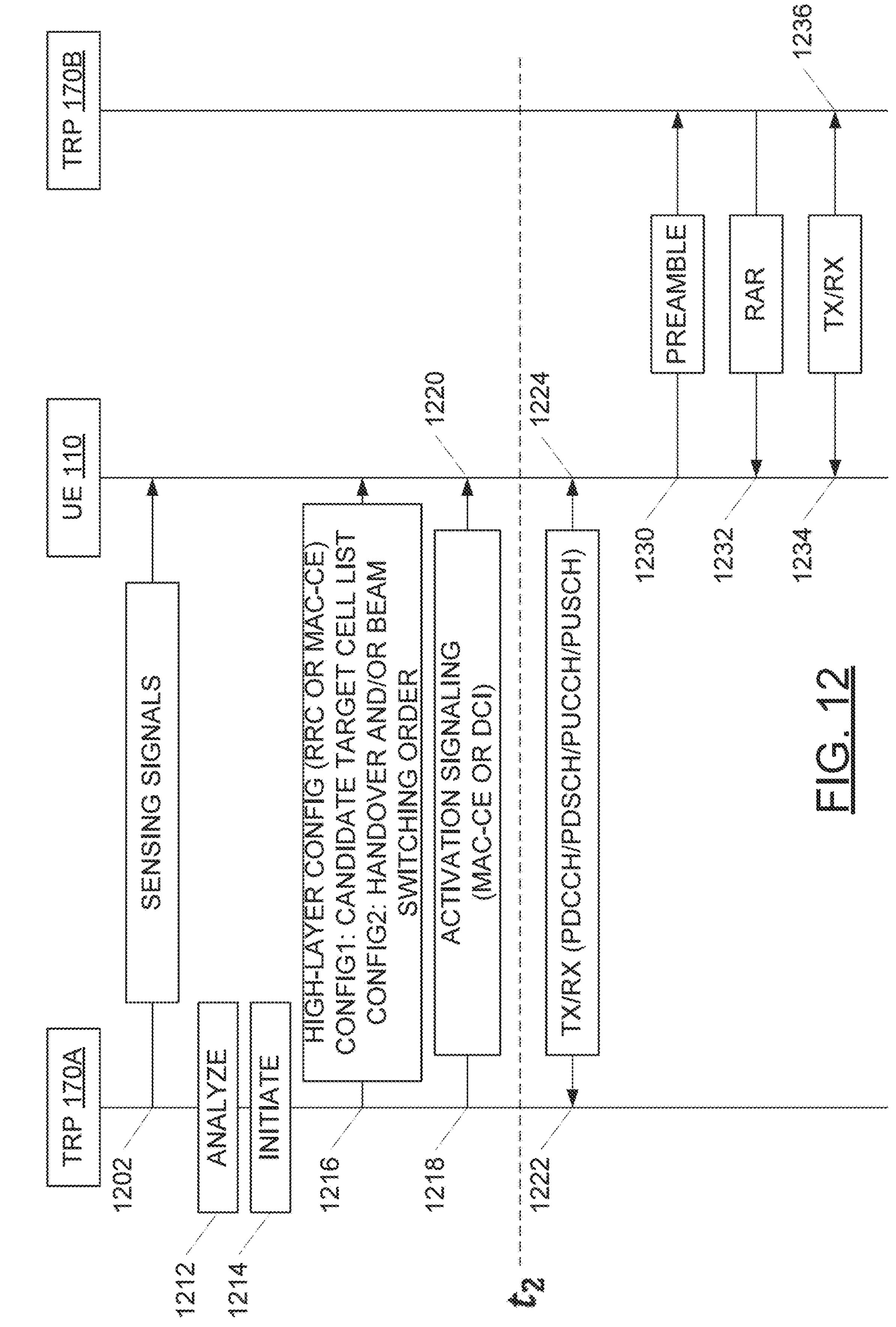
FIG. 12 illustrates, in a signal flow diagram, a beam switching process according to aspects of the present application.

FIG. 12 illustrates, in a signal flow diagram, a beam switching process according to aspects of the present application.

One aspect of predicting a reason for initiating a beam switching procedure involves the source TRP 170A monitoring the location of the UE 110.

Options for monitoring the location of the UE 110 may include the use of AI technology and the use of sensing signals and/or channel measurements and/or channel monitoring.

In one approach to the use of sensing signals, the source TRP 170A transmits (step 1202) sensing signals. The source TRP 170A then analyzes (step 1212) reflections of the sensing signals to obtain information about the environment in which both the source TRP 170A and the UE 110 are operating.

Step 1202 may be considered to be optional, since the beam direction could be obtained not only based on the sensing signal but also based on other approaches, for example, based on channel measurements for initial access and/or channel monitoring after initial access, or based on channel inferring by AI technologies from the historical channel data of the wireless network.

By analyzing (step 1212) versions of the sensed environment obtained through temporally separated transmissions (step 1202) of sensing signals, the source TRP 170A may monitor changes in the location of the UE 110. Notably, the source TRP 170A may not be able to directly monitor changes in the location of the UE 110. However, the source TRP 170A may be able to directly monitor changes in the location of a target (e.g., a car) and the source TRP 170A may maintain an association between the target and the UE 110.

In addition to the analyzing (step 1212) obtaining information about the present location of the UE 110 and past locations of the UE 110, the source TRP 170A may use the analyzing (step 1212) to attempt to predict a future location for the UE 110. It is in the attempt to predict a future location for the UE 110 that the source TRP 170A may employ AI technology. One result of the analyzing (step 1212) may be a future location for the UE 110. Another result of the analyzing (step 1212) may be a selection of a new transmit beam direction to activate for use, by the source TRP 170A, when transmitting to the UE 110 when the UE 110 is in the future location. On the basis of trends recognized in the analyzing (step 1212), the source TRP 170A may predict that the quality of the communication link between the source TRP 170A and the UE 110 will deteriorate at a future moment, $t_2$. That is, a further result of the analyzing (step 1212) may be a prediction of the future moment, $t_2$, at which the new transmit beam direction is expected to be activated to provide a more robust communication link than the existing transmit beam direction. Correspondingly, the former transmit beam is deactivated at the same future moment, $t_2$.

Responsive to initiating (step 1214) the beam switching procedure, the source TRP 170A transmits (step 1216) higher-layer configuration to UE 110 through RRC or MAC-CE. The configuration at least includes candidate target cell ID list and corresponding candidate beam information. Beam ID and/or beam direction may be included in the candidate beam information. The handover and/or beam switching order of each cell in the candidate target cell list can be optionally included in the higher-layer configuration.

Responsive to initiating (step 1214) the beam switching procedure, the source TRP 170A transmits (step 1218), to the UE 110 using L1/L2 dynamic activation signaling, an activation instruction, that is, an instruction to perform beam switching. The transmission (step 1218) of the activation signaling may be accomplished using a MAC-CE on the PDSCH. Alternatively, the transmission (step 1218) of the activation signaling may be accomplished using a dedicated DCI on the PDCCH. The activation signaling may include a beam indication for a to-be-activated receive beam direction corresponding to the to-be-activated transmit beam direction and an indication of the future time at which the switch to the to-be-activated transmit beam direction will occur at the source TRP 170A.

The indication of the future time may take the form of a time offset (Δt), wherein Δt is equal to or larger than 0. The future moment, $t_2$, at which the new transmit beam direction is to be activated at the source TRP 170A may be determined, at the UE 110, by combining the time offset, Δt, which has been received (step 1220) as part of the activation signaling, with a reference time point, $t_{ref}$. The reference time point, $t_{ref}$, allows both the source TRP 170A and the UE 110 to determine the same moment, $t_2=t_{ref}+\Delta t$, for the switch to the to-be-activated transmit beam direction. The reference time point, $t_{ref}$, may be pre-configured at both the source TRP 170A and the UE 110. Alternatively, the reference time point, $t_{ref}$, may be transmitted (step 1218) as part of the activation signaling.

The activation signaling or higher-layer configuration may indicate, to the UE 110, a beam direction to-be-activated for receiving a physical channel (PDCCH, PDSCH) and/or a beam direction to-be-activated for transmitting a physical channel (PUCCH, PUSCH). The activation signaling or higher-layer configuration may indicate the to-be-activated beam direction using a coordinate-based beam indication. The activation signaling may indicate the to-be-activated beam direction as an absolute beam direction using the defined coordinate system. Alternatively, the activation signaling or higher-layer configuration may indicate the to-be-activated receive beam direction using a differential representation of the to-be-activated receive beam direction in the context of a reference beam direction by using differential coordinates. The reference beam direction may be related to the beam direction used, by the source TRP 170A, to transmit (step 1202) the sensing signals.

If the handover and/or beam switching order of each cell are configured subsequent to transmitting (step 1218) the activation signaling, the source TRP 170A will find the to-be-switched target cell and beam order in the higher-layer configured list of candidate cell and beam. The source TRP 170A wait until the specified future moment, $t_2$, to switch the new transmit beam direction for the task of transmitting (step 1222) to the UE 110 using the PDSCH and/or the PDCCH.

If the handover and/or beam switching order of each cell are not configured subsequent to transmitting (step 1218) the activation signaling, the source TRP 170A will find the to-be-switched target cell and beam in the activation signaling. The source TRP 170A wait until the specified future moment, $t_2$, to switch the new transmit beam direction for the task of transmitting (step 1222) to the UE 110 using the PDSCH and/or the PDCCH.

If the handover and/or beam switching order of each cell are configured, responsive to receiving (step 1220) the activation signaling, the UE 110 will find the to-be-switched target cell and beam order in the higher-layer configured list of candidate cell and beam. The UE 110 may wait until the specified future moment, $t_2$, to switch to the new received beam direction for the task of receiving (step 1224) transmissions from the source TRP 170A.

If the handover and/or beam switching order of each cell are not configured responsive to receiving (step 1220) the activation signaling, the UE 110 will find the to-be-switched target cell and beam in the activation signaling. The UE 110 may wait until the specified future moment, $t_2$, to switch to the new receive beam direction for the task of receiving (step 1224) transmissions from the source TRP 170A.

If a transmission (step 1222) is to be performed, by the source TRP 170A, after the future moment, $t_2$, the source TRP 170A is to activate the new transmit beam direction for communication (Tx/Rx, step 1222) after the future moment, $t_2$.

In the inter-cell scenario, at the future moment, $t_2$, the UE 110 transmits (step 1230) a PRACH preamble to the target TRP 170B using the new beam direction. The UE 110 then monitors the SSB beam until the UE 110 receives (step 1232) a RAR from the target TRP 170B within a predetermined time window. Responsive to receiving (step 1232) the RAR, the UE 110 may perform a timing adjustment. After receiving (step 1232) the RAR, the physical layer at the UE 110 may report the actual beam direction to a higher layer at the UE 110.

Subsequently, the UE 110 may transmit and receive (step 1234) and the target TRP 170B may transmit and receive (step 1236) using the new beam direction.

Aspects of the present application provide a unified PHY beam switching mechanism with adaptations for intra-cell mobility and inter-cell mobility. The mechanism may maintain a single beam operation or a multi-beam operation. The mechanism may support a single node/panel mode or multiple nodes/panel modes at the UE 110. The activated beam direction may relate to the same cell (intra-cell) or may relate to different cells (inter-cell). In some aspects, indication of beam direction is performed using a coordinate-based beam indication method.

Figure 13:
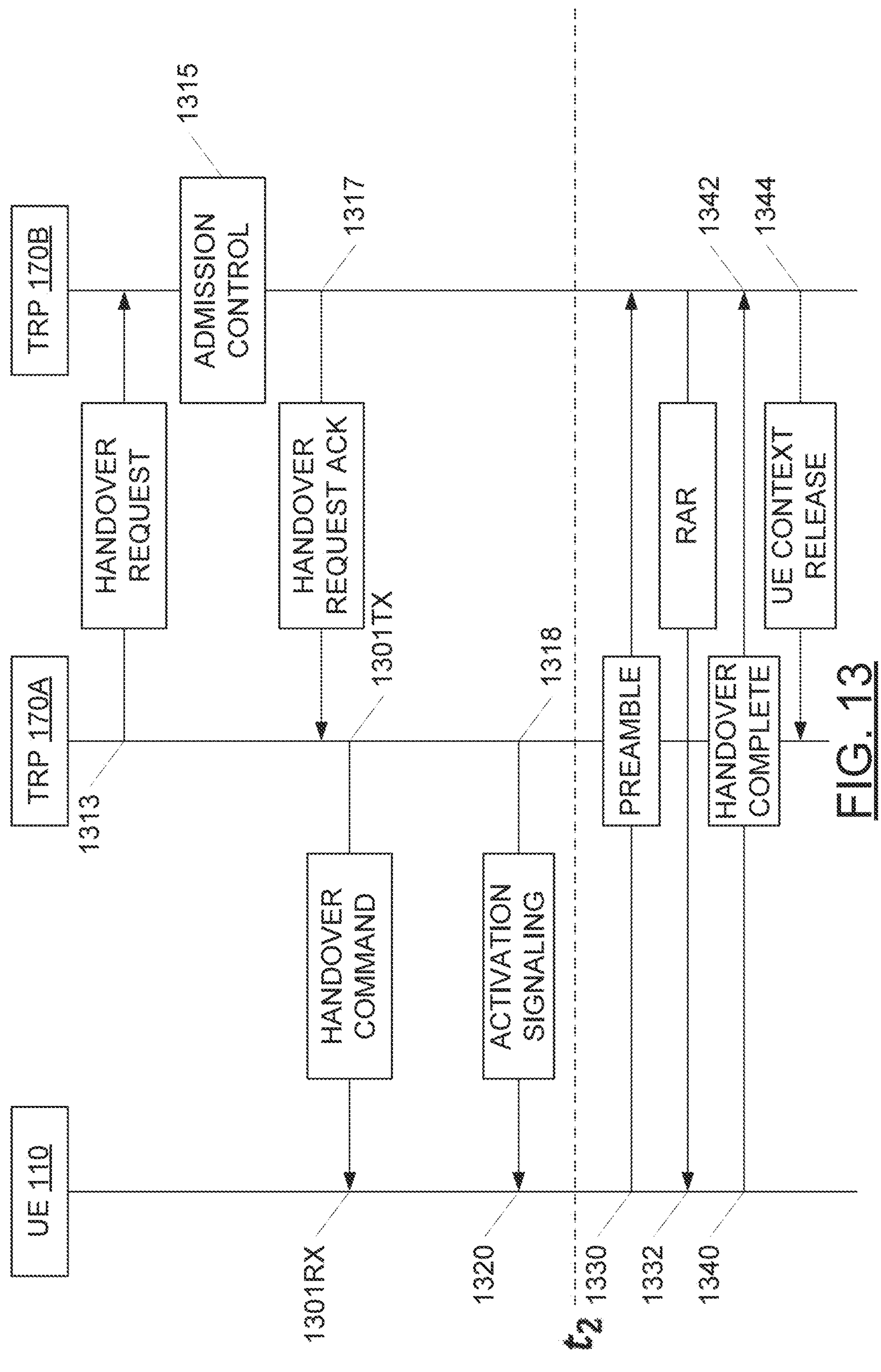
FIG. 13 illustrates, in a signal flow diagram, a beam switching process according to aspects of the present application.

FIG. 13 illustrates, in a signal flow diagram, a beam switching process according to aspects of the present application.

Initially, a source TRP 170A uses sensing to determine a target TRP 170B for a handover. Additionally, the source TRP 170A uses sensing to determine a to-be-activated beam direction for the handover. The source TRP 170A transmits (step 1313), to the target TRP 1706, a handover request with an indication of the to-be-activated beam direction. The handover request may include downlink and/or uplink measurement information.

The target 170B performs (step 1315) admission control and transmits (step 1317) an acknowledgement of the handover request. The target TRP 1706 may provide an RRC configuration as part of the acknowledgement of the handover request.

The source TRP 170A transmits (step 1301TX), via RRC signaling or MAC-CE, a handover command to the UE 110. The handover command includes handover information. The handover information may include the RRC configuration settings that the source TRP 170A received from the target TRP 1706 in the acknowledgement of the handover request. The handover information may contains all the RRC (L3) configuration settings required for the UE 110 to be switched to the cell associated with the target TRP 1706. The RRC (L3) configuration settings may be used, by the UE 110, to prepare for dynamic beam switching controlled by PHY/MAC (L1/L2) signaling.

The handover command transmitted in step 1301TX may include: an identifier list of the candidate physical cell associated with the target TRP 170B and the corresponding candidate beam information; an indication of the orientation direction of antennas at the target TRP 170; an indication of the carrier frequency; an indication of an initial value for a T304-like countdown timer; a new UE identifier, e.g., cell radio network temporary identifier (C-RNTI); target TRP 170B security algorithm identifiers, such as component carrier (CC) information; RACH configuration(s) associated to the orientation direction of antennas at the target TRP 170;

and resource settings for RRC connection setup between the UE 110 and the target TRP 170B, such as UL/DL allocation for the UE 110. Beam ID and/or beam direction may be included in the candidate beam information.

Notably, the orientation direction of antennas at the target TRP 170 may be used as a reference beam direction. The orientation direction of antennas at the target TRP 170 is not included in a handover command message in current NR handover procedure.

Further notably, common/dedicated RACH configuration in the cell associated with the target TRP 170B can be associated to the to-be-activated beam direction. RACH configuration(s) are known to include a set of dedicated RACH resources for contention-free random access.

The resource settings for RRC connection setup between the UE 110 and the target TRP 170B is not known to be available in the traditional NR handover procedure. Instead, in the traditional NR procedure, the UE 110 is instructed to perform RRC connection setup configuration after a cell switch has been achieved. In contrast, in aspects of the present application, resource configuration is performed in advance of the cell switch being performed. This clears the way for a significant improvement in the switching speed during the beam switching period.

It is notable that the UE 110 receives (step 1301RX) the handover command via RRC signaling.

It is further notable that, after receiving (step 1301RX) the handover command, the UE 110 does not immediately move the connection to the target TRP 170B.

Instead, the source TRP 170A transmits (step 1318) dynamic beam activation signaling. As discussed hereinbefore in the context of step 1218 in FIG. 12, the transmission (step 1318) of the dynamic beam activation signaling may be accomplished using a MAC-CE on the PDSCH. Alternatively, the transmission (step 1318) of the dynamic beam activation signaling may be accomplished using a dedicated DCI on the PDCCH. Upon receiving (step 1320), via PHY/MAC, the dynamic beam activation signaling, the UE 110 commences switching from the source TRP 170A to the target TRP 170B and activates a beam in the to-be-activated beam direction. Further responsive to receiving (step 1320) the dynamic beam activation signaling, the UE 110 may deactivate an existing beam.

In aspects of the present application, PHY/MAC signaling (e.g., step 1318) is used to control handover instead of the RRC signaling that is used in current NR handover procedures. It may be shown that RRC signaling is time-consuming, while PHY/MAC signaling is fast and flexible. In addition, it may be shown that an RRC fuzzy period exists when beam switching is performed using RRC signaling and the RRC fuzzy period may be shown to have a detrimental effect on system communication capability. However, it can be shown that this problem does not occur if PHY/MAC signaling is used to communicate the activation signaling.

The L1/L2 dynamic activation signaling transmitted in step 1318 may include indications of carriers and indications of BWPs. The L1/L2 dynamic activation signaling transmitted in step 1318 may indicate, to the UE 110, a beam direction to-be-activated for receiving a physical channel (PDCCH, PDSCH) and/or a beam direction to-be-activated for transmitting a physical channel (PUCCH, PUSCH). The activation signaling may indicate the to-be-activated beam direction using a coordinate-based beam indication. The activation signaling may indicate the to-be-activated beam direction may be expressed as an absolute beam direction using the defined coordinate system. Alternatively, the activation signaling may indicate the to-be-activated receive beam direction using a differential representation of the to-be-activated receive beam direction in the context of a reference beam direction by using differential coordinates.

The L1/L2 dynamic activation signaling transmitted in step 1318 may include an ID for the cell associated with the source TRP 170A or an ID for the cell associated with the target TRP 170B.

The L1/L2 dynamic activation signaling transmitted in step 1318 may include an SSB configuration associated with the target TRP 170B and the to-be-activated beam direction associated with the target TRP 170B. The to-be-activated beam direction may be indicated by using absolute coordinates, by using differential coordinate or by using a beam index.

The differential beam indication may be expressed in reference to the orientation of the target TRP 170B. It has been discussed hereinbefore that the orientation of the target TRP 170B may be preconfigured at the UE 110 via RRC signaling.

The L1/L2 dynamic activation signaling transmitted in step 1318 may include an indication of the future time at which the switch to the to-be-activated beam direction is to occur at the UE 110.

The indication of the future time may take the form of a time offset (Δt), wherein Δt is equal to or larger than 0. The future moment, $t_2$, at which the new beam direction is to be activated at the target TRP 170B may be determined, at the UE 110, by combining the time offset, Δt, which has been received (step 1320) as part of the activation signaling, with a reference time point, $t_{ref}$. The reference time point, $t_{ref}$, allows both the target TRP 170B and the UE 110 to determine the same moment, $t_2=t_{ref}+\Delta t$, for the switch to the to-be-activated beam direction. The reference time point, $t_{ref}$, may be pre-configured at both the TRP 170A and the UE 110.

The L1/L2 dynamic activation signaling transmitted in step 1318 may include a sequence timing adjustment. Subsequent to transmitting the activation signaling, the source TRP 170A will find the to-be-switched target cell and beam in the activation signaling. Responsive to receiving the activation signaling, the UE 110 will find the to-be-switched target cell and beam in the activation signaling.

In another possible implementation, step 1301, step 1318 and step 1320 may be replaced with the source TRP 170A transmitting (step 1301TX), via RRC signaling or MAC-CE, a handover command to the UE 110. The handover command includes handover information. The handover information may include higher-layer configuration. The higher-layer configuration may include: candidate target cell ID list and corresponding candidate beam information and the handover and/or beam switching order of each cell in the list; an indication of the orientation direction of antennas at the target TRP 170; an indication of the carrier frequency; an indication of an initial value for a T304-like countdown timer; a new UE identifier, e.g., cell radio network temporary identifier (C-RNTI); target TRP 170B security algorithm identifiers, such as component carrier (CC) information; RACH configuration(s) associated to the orientation direction of antennas at the target TRP 170; and resource settings for RRC connection setup between the UE 110 and the target TRP 170B, such as UL/DL allocation for the UE 110. Beam ID and/or beam direction may be included in the candidate beam information.

The configuration, to the UE 110, of a beam direction to-be-activated for receiving a physical channel (PDCCH, PDSCH) and/or a beam direction to-be-activated for transmitting a physical channel (PUCCH, PUSCH). The configuration may indicate the to-be-activated beam direction using a coordinate-based beam indication. The configuration may indicate the to-be-activated beam direction as an absolute beam direction using the defined coordinate system. Alternatively, the configuration may indicate the to-be-activated receive beam direction using a differential representation of the to-be-activated receive beam direction in the context of a reference beam direction by using differential coordinates. The reference beam direction may be related to the beam direction used, by the source TRP 170A, to transmit the sensing signals. Responsive to initiating the beam switching procedure, the source TRP 170A transmits, to the UE 110 using L1/L2 dynamic activation signaling, an activation instruction, that is, an instruction to perform beam switching. The transmission of the activation signaling may be accomplished using a MAC-CE on the PDSCH. Alternatively, the transmission of the activation signaling may be accomplished using a dedicated DCI on the PDCCH. The activation signaling may include an indication of the future time at which the switch to the to-be-activated transmit beam direction will occur at the source TRP 170A.

The indication of the future time may take the form of a time offset (Δt), wherein Δt is equal to or larger than 0. The future moment, $t_2$, at which the new transmit beam direction is to be activated at the source TRP 170A may be determined, at the UE 110, by combining the time offset, Δt, which has been received as part of the activation signaling, with a reference time point, $t_{ref}$. The reference time point, $t_{ref}$, allows both the source TRP 170A and the UE 110 to determine the same moment, $t_2=t_{ref}+\Delta t$, for the switch to the to-be-activated transmit beam direction. The reference time point, $t_{ref}$, may be pre-configured at both the source TRP 170A and the UE 110. Alternatively, the reference time point, $t_{ref}$, may be transmitted as part of the activation signaling. Subsequent to transmitting the activation signaling, the source TRP 170A will find the to-be-switched target cell and beam in order in the higher-layer configured list of candidate cell and beam. Responsive to receiving the activation signaling, the UE 110 will find the to-be-switched target cell and beam in order in the higher-layer configured list of candidate cell and beam.

In another possible implementation, step 1301, step 1318 and step 1320 may be replaced with a step wherein the source TRP 170A transmits (step 1301TX), via RRC signaling or a MAC-CE, a handover command to the UE 110. The handover command includes handover information. The handover information may include higher-layer configuration. The configuration may include: candidate target cell ID list and corresponding candidate beam information; an indication of the orientation direction of antennas at the target TRP 170; an indication of the carrier frequency; an indication of an initial value for a T304-like countdown timer; a new UE identifier, e.g., cell radio network temporary identifier (C-RNTI); target TRP 1706 security algorithm identifiers, such as component carrier (CC) information; RACH configuration(s) associated to the orientation direction of antennas at the target TRP 170; and resource settings for RRC connection setup between the UE 110 and the target TRP 170B, such as UL/DL allocation for the UE 110. Beam ID and/or beam direction may be included in the candidate beam information.

The handover and/or beam switching order of each cell in the candidate target cell list can be optionally included in the higher-layer configuration. Responsive to initiating the beam switching procedure, the source TRP 170A transmits, to the UE 110 using L1/L2 dynamic activation signaling, an activation instruction, that is, an instruction to perform beam switching. The transmission of the activation signaling may be accomplished using a MAC-CE on the PDSCH. Alternatively, the transmission of the activation signaling may be accomplished using a dedicated DCI on the PDCCH. The activation signaling may include a beam indication for a to-be-activated receive beam direction corresponding to the to-be-activated transmit beam direction and an indication of the future time at which the switch to the to-be-activated transmit beam direction will occur at the source TRP 170A.

The indication of the future time may take the form of a time offset (Δt), wherein Δt is equal to or larger than 0. The future moment, $t_2$, at which the new transmit beam direction is to be activated at the source TRP 170A may be determined, at the UE 110, by combining the time offset, Δt, which has been received as part of the activation signaling, with a reference time point, $t_{ref}$. The reference time point, $t_{ref}$, allows both the source TRP 170A and the UE 110 to determine the same moment, $t_2=t_{ref}+\Delta t$, for the switch to the to-be-activated transmit beam direction. The reference time point, $t_{ref}$, may be pre-configured at both the source TRP 170A and the UE 110. Alternatively, the reference time point, $t_{ref}$, may be transmitted as part of the activation signaling.

The activation signaling or higher-layer configuration may indicate, to the UE 110, a beam direction to-be-activated for receiving a physical channel (PDCCH, PDSCH) and/or a beam direction to-be-activated for transmitting a physical channel (PUCCH, PUSCH). The activation signaling or higher-layer configuration may indicate the to-be-activated beam direction using a coordinate-based beam indication. The activation signaling may indicate the to-be-activated beam direction as an absolute beam direction using the defined coordinate system. Alternatively, the activation signaling or higher-layer configuration may indicate the to-be-activated receive beam direction using a differential representation of the to-be-activated receive beam direction in the context of a reference beam direction by using differential coordinates. The reference beam direction may be related to the beam direction used, by the source TRP 170A, to transmit the sensing signals.

If the handover and/or beam switching order of each cell are configured, subsequent to transmitting the activation signaling, the source TRP 170A will find the to-be-switched target cell and beam in order in the higher-layer configured list of candidate cell and beam. If the handover and/or beam switching order of each cell are not configured subsequent to transmitting the activation signaling, the source TRP 170A will find the to-be-switched target cell and beam in the activation signaling. If the handover and/or beam switching order of each cell are configured, responsive to receiving the activation signaling, the UE 110 will find the to-be-switched target cell and beam in order in the higher-layer configured list of candidate cell and beam. If the handover and/or beam switching order of each cell are not configured, responsive to receiving the activation signaling, the UE 110 will find the to-be-switched target cell and beam in the activation signaling.

At the future moment, $t_2$, the UE 110 transmits (step 1330) a PRACH preamble to the target TRP 170B using the newly activated beam direction. The UE 110 then monitors the SSB beam until the UE 110 receives (step 1332) a RAR from the target TRP 170B within a predetermined time window. Responsive to receiving (step 1332) the RAR, the UE 110 may perform a timing adjustment. After receiving (step 1332) the RAR, the physical layer at the UE 110 may report the actual beam direction to a higher layer at the UE 110.

The UE 110 then transmits (step 1340) a handover complete message to the target TRP 170.

Responsive to receiving (step 1342) the handover complete message, the target TRP 170B transmits (step 1344) a UE context release to the source TRP 170A.

The signal flow diagram of FIG. 6 illustrates example steps of an inter-cell beam switching method that is based around PHY/MAC dynamic activation signaling. The signal flow diagram of FIG. 5, in contrast, provides only example steps related to the UE 110 switching to a new connection with a distinct TRP 170.

Each UE 110 may be classified into one of two categories, with dependence upon whether the UE 110 in question is capable of simultaneously maintaining multiple beam pair links. If a given UE 110 has a single panel, the given UE 110 can perform simultaneous reception of channels and signals from the source TRP 170 or the target TRP 170B. If a given UE 110 has multiple panels, the given UE 110 can perform simultaneous reception of channels and signals from the source TRP 170A and the target TRP 1706. With foreknowledge of the two types of UEs 110, two inter-cell beam switching solutions are separately contemplated in aspects of the present application. For single-panel-based UEs 110, an inter-cell beam switching solution is proposed in a signal flow diagram in FIG. 14.

Figure 14:
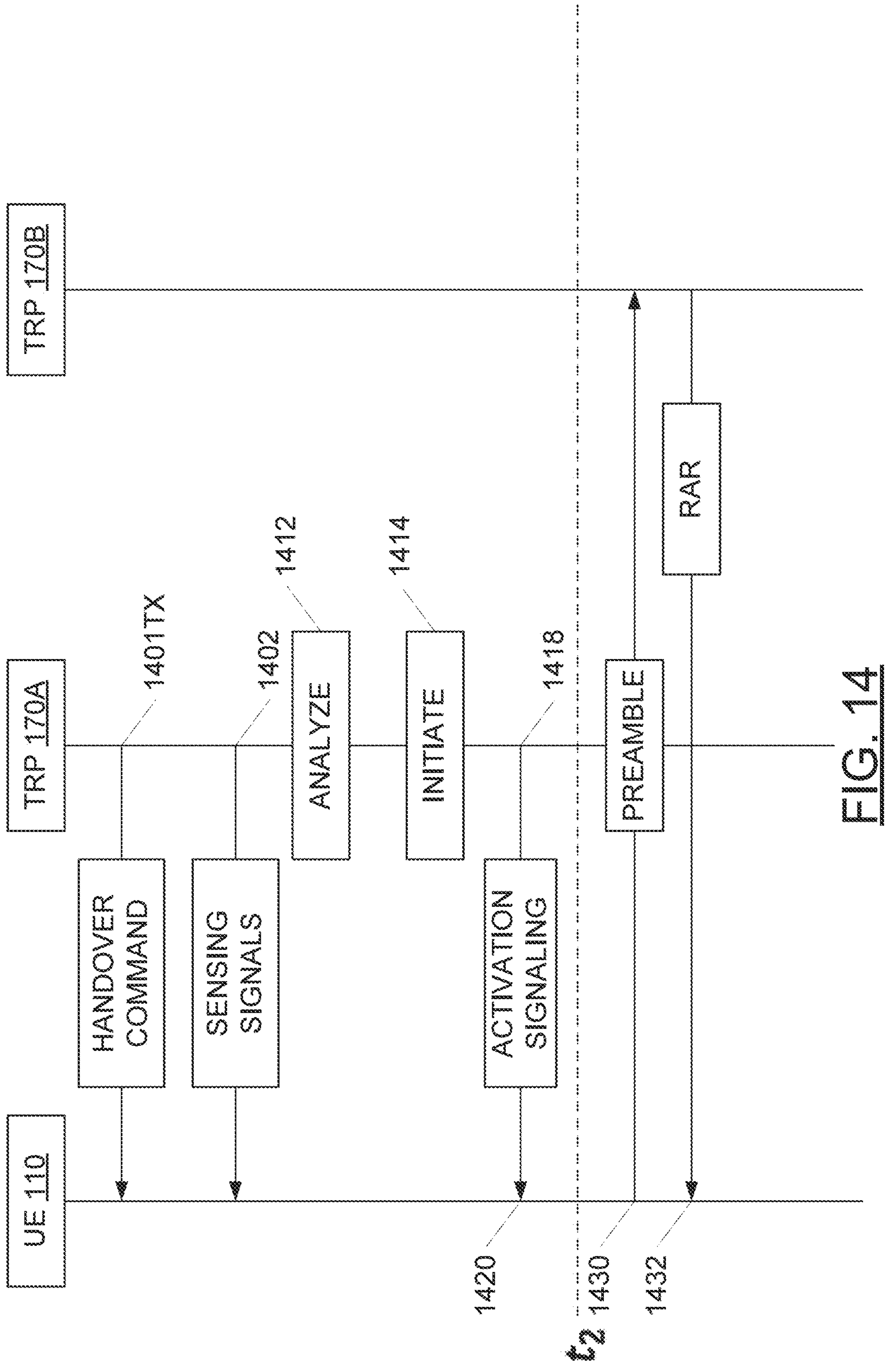
FIG. 14 illustrates, in a signal flow diagram, an inter-cell beam switching process for a single-panel user equipment, according to aspects of the present application.

FIG. 14 illustrates, in a signal flow diagram, an inter-cell beam switching process for a single-panel UE 110, according to aspects of the present application.

For inter-cell beam switching, configuration information, about the target TRP 170B, is provided to the UE 110 via RRC signaling. The source TRP 170A transmits (step 1401TX), to the UE 110, the configuration information in a handover command message. Details related to the configuration settings have been described hereinbefore in the context of the signal flow diagram in FIG. 6.

One aspect of predicting a reason for initiating an inter-cell beam switching procedure involves the source TRP 170A monitoring the location of the UE 110.

Options for monitoring the location of the UE 110 may include the use of AI technology and the use of sensing signals and/or channel measurements and/or channel monitoring.

In one approach to the use of sensing signals, the source TRP 170A transmits (step 1402) sensing signals. The source TRP 170A then analyzes (step 1412) reflections of the sensing signals to obtain information about the environment in which both the source TRP 170A and the UE 110 are operating.

Step 1402 may be considered to be optional, since the beam direction could be obtained not only based on the sensing signal but also based on other approaches, for example, based on channel measurements for initial access and/or channel monitoring after initial access, or based on channel inferring by AI technologies from the historical channel data of the wireless network.

By analyzing (step 1412) versions of the sensed environment obtained through temporally separated transmissions (step 1402) of sensing signals, the source TRP 170A may monitor changes in the location of the UE 110. Notably, the source TRP 170A may not be able to directly monitor changes in the location of the UE 110. However, the source TRP 170A may be able to directly monitor changes in the location of a target (e.g., a car) and the source TRP 170A may maintain an association between the target and the UE 110.

In addition to the analyzing (step 1412) obtaining information about the present location of the UE 110 and past locations of the UE 110, the source TRP 170A may use the analyzing (step 1412) to attempt to predict a future location for the UE 110. It is in the attempt to predict a future location for the UE 110 that the source TRP may employ AI technology. One result of the analyzing (step 1412) may be a future location for the UE 110. Another result of the analyzing (step 1412) may be a selection of a new transmit beam direction to activate for use, by the source TRP 170A, when transmitting to the UE 110 when the UE 110 is in the future location. On the basis of trends recognized in the analyzing (step 1412), the source TRP 170A may predict that the quality of the communication link between the source TRP 170A and the UE 110 will deteriorate at a future moment, $t_2$. That is, a further result of the analyzing (step 1412) may be a prediction of the future moment, $t_2$, at which an inter-cell handover should occur. Correspondingly, the beam from the source TRP 170A may be deactivated at the same future moment, $t_2$.

Responsive to initiating (step 1414) the beam switching procedure, the source TRP 170A transmits (step 1418), to the UE 110 using L1/L2 dynamic activation signaling, an activation instruction, that is, an instruction to perform beam switching. The transmission (step 1418) of the activation signaling may be accomplished using a MAC-CE on the PDSCH. Alternatively, the transmission (step 1418) of the activation signaling may be accomplished using a dedicated DCI on the PDCCH. The activation signaling may include a beam indication for a to-be-activated receive beam direction corresponding to the to-be-activated transmit beam direction and an indication of the future time at which the switch to the to-be-activated transmit beam direction will occur at the source TRP 170A.

As discussed hereinbefore in the context of step 1218 in FIG. 12, the transmission (step 1418) of the dynamic beam activation signaling may be accomplished using a MAC-CE on the PDSCH. Alternatively, the transmission (step 1418) of the dynamic beam activation signaling may be accomplished using a dedicated DCI on the PDCCH. Upon receiving (step 1420), via PHY/MAC, the dynamic beam activation signaling, the UE 110 commences switching from the source TRP 170A to the target TRP 1706 and activates a beam in the to-be-activated beam direction. Further responsive to receiving (step 1420) the dynamic beam activation signaling, the UE 110 may deactivate an existing beam.

In aspects of the present application, PHY/MAC signaling (e.g., step 1418) is used to control handover instead of the RRC signaling that is used in current NR handover procedures. It may be shown that RRC signaling is time-consuming, while PHY/MAC signaling is fast and flexible. In addition, it may be shown that an RRC fuzzy period exists when beam switching is performed using RRC signaling and the RRC fuzzy period may be shown to have a detrimental effect on system communication capability. However, it can be shown that this problem does not occur if PHY/MAC signaling is used to communicate the activation signaling.

The L1/L2 dynamic activation signaling transmitted in step 1418 may include indications of carriers and indications of BWPs. The L1/L2 dynamic activation signaling transmitted in step 1418 may indicate, to the UE 110, a beam direction to-be-activated for receiving a physical channel (PDCCH, PDSCH) and/or a beam direction to-be-activated for transmitting a physical channel (PUCCH, PUSCH). The activation signaling may indicate the to-be-activated beam direction using a coordinate-based beam indication. The activation signaling may indicate the to-be-activated beam direction may be expressed as an absolute beam direction using the defined coordinate system. Alternatively, the activation signaling may indicate the to-be-activated receive beam direction using a differential representation of the to-be-activated receive beam direction in the context of a reference beam direction by using differential coordinates.

The L1/L2 dynamic activation signaling transmitted in step 1418 may include an ID for the cell associated with the source TRP 170A or an ID for the cell associated with the target TRP 170B.

The L1/L2 dynamic activation signaling transmitted in step 1418 may include an SSB configuration associated with the target TRP 170B and the to-be-activated beam direction associated with the target TRP 170B. The to-be-activated beam direction may be indicated by using absolute coordinates, by using differential coordinate or by using a beam index.

The differential beam indication may be expressed in reference to the orientation of the target TRP 170B. It has been discussed hereinbefore that the orientation of the target TRP 170B may be preconfigured at the UE 110 through receipt (step 1401RX) of RRC signaling.

The L1/L2 dynamic activation signaling transmitted in step 1418 may include an indication of the future time at which the switch to the to-be-activated beam direction is to occur at the UE 110.

Further, in another possible implementation, the step 1401, the step 1418 and the step 1420 may be carried out in a possible implementation described in view of FIG. 13.

The indication of the future time may take the form of a time offset (Δt), wherein Δt is equal to or larger than 0. The future moment, $t_2$, at which the new beam direction is to be activated at the target TRP 170B may be determined, at the UE 110, by combining the time offset, Δt, which has been received (step 1420) as part of the activation signaling, with a reference time point, $t_{ref}$. The reference time point, $t_{ref}$, allows both the target TRP 170B and the UE 110 to determine the same moment, $t_2=t_{ref}+\Delta t$, for the switch to the to-be-activated beam direction. The reference time point, $t_{ref}$, may be pre-configured at both the TRP 170A and the UE 110.

The L1/L2 dynamic activation signaling transmitted in step 1418 may include a sequence timing adjustment.

At the future moment, $t_2$, the UE 110 transmits (step 1430) a PRACH preamble to the target TRP 170B using the newly activated beam direction. The UE 110 then monitors the SSB beam until the UE 110 receives (step 1432) a RAR from the target TRP 170B within a predetermined time window. Responsive to receiving (step 1432) the RAR, the UE 110 may perform a timing adjustment. After receiving (step 1432) the RAR, the physical layer at the UE 110 may report the actual beam direction to a higher layer at the UE 110.

Figure 15:
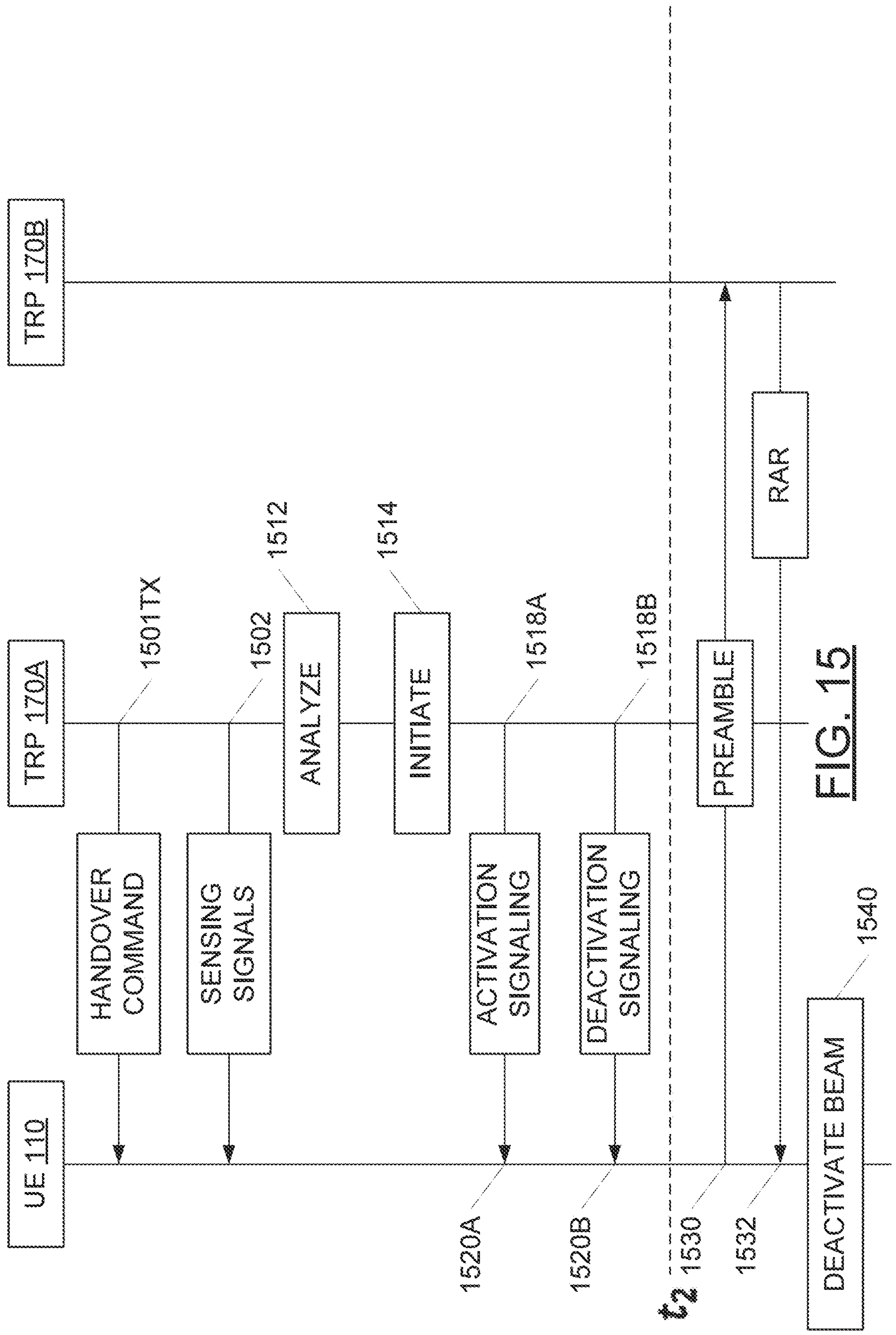
FIG. 15 illustrates, in a signal flow diagram, an inter-cell beam switching process for a multi-panel user equipment, according to aspects of the present application.

For multi-panel-based UEs 110, an inter-cell beam switching solution is proposed in a signal flow diagram in FIG. 15.

FIG. 15 illustrates, in a signal flow diagram, an inter-cell beam switching process for a multi-panel UE 110, according to aspects of the present application.

For inter-cell beam switching, configuration information, about the target TRP 170B, is provided to the UE 110 via RRC signaling. The source TRP 170A transmits (step 1501TX), to the UE 110, the configuration information in a handover command message. Details related to the configuration settings have been described hereinbefore in the context of the signal flow diagram in FIG. 13.

One aspect of predicting a reason for initiating an inter-cell beam switching procedure involves the source TRP 170A monitoring the location of the UE 110.

Options for monitoring the location of the UE 110 may include the use of AI technology and the use of sensing signals and/or channel measurements and/or channel monitoring.

In one approach to the use of sensing signals, the source TRP 170A transmits (step 1502) sensing signals. The source TRP 170A then analyzes (step 1512) reflections of the sensing signals to obtain information about the environment in which both the source TRP 170A and the UE 110 are operating.

Step 1502 may be considered to be optional, since the beam direction could be obtained not only based on the sensing signal but also based on other approaches, for example, based on channel measurements for initial access and/or channel monitoring after initial access, or based on channel inferring by AI technologies from the historical channel data of the wireless network.

By analyzing (step 1512) versions of the sensed environment obtained through temporally separated transmissions (step 1502) of sensing signals, the source TRP 170A may monitor changes in the location of the UE 110. Notably, the source TRP 170A may not be able to directly monitor changes in the location of the UE 110. However, the source TRP 170A may be able to directly monitor changes in the location of a target (e.g., a car) and the source TRP 170A may maintain an association between the target and the UE 110.

In addition to the analyzing (step 1512) obtaining information about the present location of the UE 110 and past locations of the UE 110, the source TRP 170A may use the analyzing (step 1512) to attempt to predict a future location for the UE 110. It is in the attempt to predict a future location for the UE 110 that the source TRP may employ AI technology. One result of the analyzing (step 1512) may be a future location for the UE 110. Another result of the analyzing (step 1512) may be a selection of a new transmit beam direction to activate for use, by the source TRP 170A, when transmitting to the UE 110 when the UE 110 is in the future location. On the basis of trends recognized in the analyzing (step 1512), the source TRP 170A may predict that the quality of the communication link between the source TRP 170A and the UE 110 will deteriorate at a future moment, $t_2$. That is, a further result of the analyzing (step 1512) may be a prediction of the future moment, $t_2$, at which an inter-cell handover should occur. Correspondingly, the beam from the source TRP 170A may be deactivated at the same future moment, $t_2$.

Responsive to initiating (step 1514) the beam switching procedure, the source TRP 170A transmits (step 1518A), to the UE 110 using L1/L2 dynamic activation signaling, an activation instruction, that is, an instruction to perform beam switching. The transmission (step 1518A) of the activation signaling may be accomplished using a MAC-CE on the PDSCH. Alternatively, the transmission (step 1518A) of the activation signaling may be accomplished using a dedicated DCI on the PDCCH. The activation signaling may include a beam indication for a to-be-activated receive beam direction corresponding to the to-be-activated transmit beam direction and an indication of the future time at which the switch to the to-be-activated transmit beam direction will occur at the source TRP 170A.

As discussed hereinbefore in the context of step 1218 in FIG. 12, the transmission (step 1518A) of the dynamic beam activation signaling may be accomplished using a MAC-CE on the PDSCH. Alternatively, the transmission (step 1518A) of the dynamic beam activation signaling may be accomplished using a dedicated DCI on the PDCCH. Upon receiving (step 1520), via PHY/MAC, the dynamic beam activation signaling, the UE 110 commences switching from the source TRP 170A to the target TRP 1706 and activates a beam in the to-be-activated beam direction.

In aspects of the present application, PHY/MAC signaling (e.g., step 1518A) is used to control handover instead of the RRC signaling that is used in current NR handover procedures. It may be shown that RRC signaling is time-consuming, while PHY/MAC signaling is fast and flexible. In addition, it may be shown that an RRC fuzzy period exists when beam switching is performed using RRC signaling and the RRC fuzzy period may be shown to have a detrimental effect on system communication capability. However, it can be shown that this problem does not occur if PHY/MAC signaling is used to communicate the activation signaling.

The L1/L2 dynamic activation signaling transmitted in step 1518A may include indications of carriers and indications of BWPs. The L1/L2 dynamic activation signaling transmitted in step 1518A may indicate, to the UE 110, a beam direction to-be-activated for receiving a physical channel (PDCCH, PDSCH) and/or a beam direction to-be-activated for transmitting a physical channel (PUCCH, PUSCH). The activation signaling may indicate the to-be-activated beam direction using a coordinate-based beam indication. The activation signaling may indicate the to-be-activated beam direction may be expressed as an absolute beam direction using the defined coordinate system. Alternatively, the activation signaling may indicate the to-be-activated receive beam direction using a differential representation of the to-be-activated receive beam direction in the context of a reference beam direction by using differential coordinates.

The L1/L2 dynamic activation signaling transmitted in step 1518A may include an ID for the cell associated with the source TRP 170A or an ID for the cell associated with the target TRP 170B.

The L1/L2 dynamic activation signaling transmitted in step 1518A may include an SSB configuration associated with the target TRP 170B and the to-be-activated beam direction associated with the target TRP 170B. The to-be-activated beam direction may be indicated by using absolute coordinates, by using differential coordinate or by using a beam index.

The differential beam indication may be expressed in reference to the orientation of the target TRP 170B. It has been discussed hereinbefore that the orientation of the target TRP 170B may be preconfigured at the UE 110 through receipt (step 1501RX) of RRC signaling.

The L1/L2 dynamic activation signaling transmitted in step 1518A may include an indication of the future time at which the switch to the to-be-activated beam direction is to occur at the UE 110.

The indication of the future time may take the form of an activation time offset ($\Delta t$), wherein $\Delta t$ is equal to or larger than 0. The future moment, $t_2$, at which the new beam direction is to be activated at the target TRP 170B may be determined, at the UE 110, by combining the activation time offset, $\Delta t$, which has been received (step 1520A) as part of the activation signaling, with a reference time point, $t_{ref}$. The reference time point, $t_{ref}$, allows both the target TRP 170B and the UE 110 to determine the same moment, $t_2=t_{ref}+\Delta t$, for the switch to the to-be-activated beam direction. The reference time point, $t_{ref}$, may be pre-configured at both the TRP 170A and the UE 110.

The L1/L2 dynamic activation signaling transmitted in step 1518A may include a sequence timing adjustment.

Further, in another possible implementation, step 1501, step 1518 and step 1520 may be carried out in a possible implementation described in view of FIG. 13.

In addition to transmitting (step 1518A), to the UE 110, an activation instruction, the source TRP 170A may also transmit (step 1518B), to the UE 110 using L1/L2 dynamic deactivation signaling, a deactivation instruction.

The L1/L2 dynamic deactivation signaling transmitted in step 1518B may include an indication of the future time at which a specific beam is to be deactivated at the UE 110.

The transmission (step 1518B) of the deactivation signaling may be accomplished using a MAC-CE on the PDSCH. Alternatively, the transmission (step 1518B) of the deactivation signaling may be accomplished using a dedicated DCI on the PDCCH.

The L1/L2 dynamic deactivation signaling transmitted in step 1518B may include indications of carriers and indications of BWPs.

The L1/L2 dynamic deactivation signaling transmitted in step 1518B may indicate, to the UE 110, a beam direction to-be-deactivated as previously used for receiving a physical channel (PDCCH, PDSCH) and/or a beam direction to-be-deactivated as previously used for transmitting a physical channel (PUCCH, PUSCH). The deactivation signaling may indicate the to-be-deactivated beam direction using a coordinate-based beam indication. The deactivation signaling may indicate the to-be-deactivated beam direction as an absolute beam direction using the defined coordinate system. Alternatively, the deactivation signaling may indicate the to-be-deactivated beam direction using a differential representation of the to-be-deactivated beam direction in the context of a reference beam direction by using differential coordinates.

The L1/L2 dynamic deactivation signaling transmitted in step 1518B may include an ID for the cell associated with the source TRP 170A or an ID for the cell associated with the target TRP 1706.

The L1/L2 dynamic deactivation signaling transmitted in step 1518B may include an indication of a beam type. The beam type may be, for example, a physical data channel beam type, a physical control channel beam type or a reference signal beam type.

The L1/L2 dynamic deactivation signaling transmitted in step 1518B may include an indication of a future time, $t_3$, at which the particular beam is to be deactivated at the UE 110.

The indication of the future time may take the form of a deactivation time offset ($\Delta t_1$), wherein $\Delta t_1$ is equal to or larger than 0. The future moment, $t_3$, at which the old beam direction is to be deactivated at the UE 110, may be determined by combining the deactivation time offset, $\Delta t_1$, which has been received (step 1520B) as part of the deactivation signaling, with a reference time point, $t_{ref}$. The reference time point, $t_{ref}$, allows both the UE 110 to determine the future moment, $t_3=t_{ref}+\Delta t_1$, to deactivate the beam direction. The reference time point, $t_{ref}$, may be pre-configured at both the TRP 170A and the UE 110. The reference time point, $t_{ref}$, may be the time of receipt (step 1520B) of the first MAC-CE/DCI transmission carrying deactivation signaling.

At the future moment, $t_2$, the UE 110 transmits (step 1530) a PRACH preamble to the target TRP 170B using the newly activated beam direction. The UE 110 then monitors the SSB beam until the UE 110 receives (step 1532) a RAR from the target TRP 170B within a predetermined time window. Responsive to receiving (step 1532) the RAR, the UE 110 may perform a timing adjustment. After receiving (step 1532) the RAR, the physical layer at the UE 110 may report the actual beam direction to a higher layer at the UE 110.

At the future moment, $t_3$, the UE 110 deactivates (step 1540) the beam indicated in the received (step 1520B) deactivation signaling, thereby disconnecting the connection to the source TRP 170A.

Notably, the single-panel-based handover procedure (FIG. 14) includes only one L1/L2 dynamic signaling step (step 1418) for activating a new beam, whereas the multi-panel-based handover procedure (FIG. 15) includes two L1/L2 dynamic signaling steps (step 1518A and step 1518B) for activating a new beam and deactivating an existing beam.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A device comprising:

a memory storing instructions; and a processor configured, by executing the instructions, to:

receive a beam switching instruction, the beam switching instruction indicating:

a time offset indication allowing for a determination of a future moment at which to activate a new beam; and a first beam direction for the new beam, the first beam direction expressed using coordinate information, the coordinate information expressed relative to a predefined coordinate system, wherein the beam switching instruction is carried by a same type of signaling regardless of whether the beam switching instruction relates to intra-cell mobility management or to inter-cell mobility management;

communicate, before the future moment, using a second beam having a second beam direction; and communicate, after the future moment, using a third beam direction, the third beam direction corresponding to the first beam direction.

2. The device of claim 1, wherein the processor is configured, by executing the instructions, to receive the beam switching instruction over physical layer signaling or over data transport layer signaling.

3. The device of claim 1, wherein the processor is configured, by executing the instructions, to receive the beam switching instruction on a dedicated downlink control channel.

4. The device of claim 1, wherein the beam switching instruction relates to the intra-cell mobility management such that the new beam relates to communication with a source transmit receive point from which the beam switching instruction is received.

5. The device of claim 1, wherein the beam switching instruction relates to the inter-cell mobility management such that the new beam relates to communication with a target transmit receive point distinct from a source transmit receive point from which the beam switching instruction is received.

6. The device of claim 5, wherein the processor is configured, by executing the instructions, to receive a handover command, the handover command indicating resource settings for radio resource control connection setup with the target transmit receive point.

7. The device of claim 6, wherein the handover command comprises an identifier of a physical cell associated with the target transmit receive point.

8. The device of claim 6, wherein the handover command comprises an indication of orientation direction of antennas at the target transmit receive point.

9. The device of claim 8, wherein the handover command comprises random access channel configurations associated with the orientation direction of the antennas at the target transmit receive point.

10. The device of claim 6, wherein the handover command comprises an indication of an initial value for a timer.

11. The device of claim 6, wherein the handover command comprises a new user equipment identifier.

12. The device of claim 11, wherein the new user equipment identifier comprises a cell radio network temporary identifier.

13. The device of claim 6, wherein the handover command comprises security algorithm identifiers.

14. The device of claim 13, wherein the security algorithm identifiers comprise component carrier information.

15. The device of claim 1, wherein the coordinate information comprises absolute coordinate information.

16. The device of claim 1, wherein the coordinate information comprises differential coordinates relative to a reference beam direction.

17. The device of claim 16, wherein the reference beam direction comprises coordinates of a sensing beam direction.

18. The device of claim 1, wherein the beam switching instruction further comprises an indication of a reference time point.

19. The device of claim 1, wherein the time offset indication is a first time offset indication and wherein the processor is further configured, by executing the instructions, to receive a further instruction, the further instruction including a second time offset indication allowing for a determination of a second future moment at which to deactivate the second beam.

20. The device of claim 1, wherein the beam switching instruction is in a same data format carried by the same type of signaling regardless of whether the beam switching instruction relates to the intra-cell mobility management or to the inter-cell mobility management.

21. A method comprising:

receiving a beam switching instruction over physical layer signaling, the beam switching instruction indicating:

a time offset indication allowing for a determination of a future moment at which to activate a new beam; and a first beam direction for the new beam, the first beam direction expressed using coordinate information, the coordinate information expressed relative to a predefined coordinate system, wherein the beam switching instruction is carried by a same type of signaling regardless of whether the beam switching instruction relates to intra-cell mobility management or to inter-cell mobility management;

before the future moment, communicating using a second beam having a second beam direction; and after the future moment, communicating using a third beam direction, the third beam direction corresponding to the first beam direction.

* * * * *